(12) United States Patent
Okamoto et al.

(10) Patent No.: US 8,129,489 B2
(45) Date of Patent: Mar. 6, 2012

(54) ETHYLENE POLYMER AND USE THEREOF

(75) Inventors: Masahiko Okamoto, Chiba (JP); Tetsuji Kasai, Ichihara (JP); Yasushi Tohi, Ichihara (JP); Koji Endo, Ichihara (JP); Shiro Otsuzuki, Hatsukaichi (JP); Takahiro Akashi, Ichihara (JP); Kenji Iwamasa, Ichihara (JP); Yoshiyuki Hirase, Chiba (JP); Keiko Fukushi, Chiba (JP); Shinichi Nagano, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 781 days.

(21) Appl. No.: 11/660,364

(22) PCT Filed: Aug. 12, 2005

(86) PCT No.: PCT/JP2005/015106
§ 371 (c)(1),
(2), (4) Date: Feb. 16, 2007

(87) PCT Pub. No.: WO2006/019147
PCT Pub. Date: Feb. 23, 2006

(65) Prior Publication Data
US 2007/0244286 A1 Oct. 18, 2007

(30) Foreign Application Priority Data

Aug. 16, 2004 (JP) ................................ 2004-236806
Aug. 16, 2004 (JP) ................................ 2004-236807

(51) Int. Cl.
*C08F 210/02* (2006.01)
*C08F 210/14* (2006.01)
(52) U.S. Cl. ...................... 526/348; 526/352; 526/348.5; 526/348.4; 526/348.3; 526/348.2
(58) Field of Classification Search ............... 526/348.1, 526/348.2, 348.3, 348.4, 348.5, 348; 528/396
See application file for complete search history.

(56) References Cited

U.S. PATENT DOCUMENTS

| | | | |
|---|---|---|---|
| 4,071,674 A | | 1/1978 | Kashiwa et al. |
| 4,380,567 A | * | 4/1983 | Shigemoto .................... 428/213 |
| 5,519,091 A | | 5/1996 | Tsutsui et al. |
| 5,605,969 A | | 2/1997 | Tsutsui et al. |
| 6,063,871 A | * | 5/2000 | Kishine et al. ................. 525/240 |
| 6,225,421 B1 | | 5/2001 | Promel et al. |
| 6,346,575 B1 | | 2/2002 | Debras et al. |
| 6,380,311 B1 | | 4/2002 | Razavi et al. |
| 6,642,340 B1 | | 11/2003 | Takahashi et al. |
| 7,393,965 B2 | | 7/2008 | Tohi et al. |
| 7,416,686 B2 | | 8/2008 | Aarila et al. |
| 7,452,946 B2 | * | 11/2008 | Matsuura et al. ............. 526/114 |
| 7,569,175 B1 | | 8/2009 | Nilsen et al. |
| 2002/0065368 A1 | | 5/2002 | Debras et al. |
| 2002/0099140 A1 | | 7/2002 | Debras et al. |
| 2006/0047079 A1 | | 3/2006 | Takahashi et al. |
| 2006/0047096 A1 | | 3/2006 | Takahashi et al. |
| 2006/0189775 A1 | * | 8/2006 | Takahashi et al. ............ 526/352 |
| 2007/0244286 A1 | | 10/2007 | Okamoto et al. |

FOREIGN PATENT DOCUMENTS

| | | |
|---|---|---|
| EP | 0 399 348 A2 | 5/1990 |
| EP | 0572003 A2 | 12/1993 |
| EP | 1201711 A1 | 5/2002 |
| EP | 1 595 897 A1 | 11/2005 |
| JP | 49-51378 | 5/1974 |
| JP | 59-226012 A * | 12/1984 |
| JP | 3-21607 A | 1/1991 |
| JP | 3-234717 A | 10/1991 |
| JP | 5-331232 A | 12/1993 |
| JP | 9-183816 A | 7/1997 |
| JP | 10-195260 A | 7/1998 |
| JP | 11-106430 A | 4/1999 |
| JP | 11-106432 A | 4/1999 |
| JP | 11-106574 A | 4/1999 |
| JP | 11-147919 A | 6/1999 |
| JP | 2000-17018 A | 1/2000 |
| JP | 2000-109521 A | 4/2000 |
| JP | 2000-191726 A | 7/2000 |
| JP | 2001-526731 A | 12/2001 |
| JP | 2002-053615 A | 2/2002 |
| JP | 2002-138110 A | 5/2002 |
| JP | 2003-507538 A | 2/2003 |
| JP | 2003-531233 A | 10/2003 |
| JP | 2004-182715 A | 7/2004 |
| JP | 2004-269864 A | 9/2004 |
| JP | 2004-269864 A * | 9/2004 |
| JP | 2005-239750 A | 9/2005 |
| JP | 2006-83370 A | 3/2006 |
| JP | 2006-83371 A | 3/2006 |
| WO | WO-00/18814 A1 | 4/2000 |
| WO | WO-01/25328 A1 | 4/2001 |
| WO | WO 2004/104055 A1 * | 2/2004 |
| WO | WO-2004/029062 A1 | 4/2004 |
| WO | WO 2004/083265 A1 * | 9/2004 |

* cited by examiner

OTHER PUBLICATIONS

Japanese Office Action issued Jul. 27, 2010, in Japanese Application No. 2005-233961. Japanese Office Action issued Jul. 27, 2010, in Japanese Application No. 2005-233962.

*Primary Examiner* — Rip A. Lee
(74) *Attorney, Agent, or Firm* — Birch, Stewart, Kolasch & Birch, LLP

(57) ABSTRACT

The present invention provides an ethylene polymer that has excellent fluidity and moldability as well as gives a molded product having excellent mechanical strength.
The ethylene polymer of the present invention contains 0.02 to 1.50 mol % of a constitutional unit derived from α-olefin having 6 to 10 carbon atoms, and has the density of 945 to 975 kg/m$^3$, which satisfies both of the following requirements [1] and [2] simultaneously:

[1] in CFC, all the components having a molecular weight of 100,000 or more are eluted at a temperature of 85° C. or higher; and
[2] the components eluted at a temperature of 80° C. or lower account for up to 5% of all the components eluted in CFC.

5 Claims, 3 Drawing Sheets

Dimensions of ASTM-D1822 Type S tension-impact specimen

ETHYLENE POLYMER AND USE THEREOF

This application is the national phase of PCT International Application No. PCT/JP2005/015106 filed on Aug. 12, 2005 under 35 U.S.C. §371, which claims priority to JP 2004-236806, filed on Aug. 16, 2004 and JP 2004-236807, filed on Aug. 16, 2004. The entire contents of each of the above-identified applications are hereby incorporated by reference.

TECHNICAL FIELD

The present invention relates to an ethylene polymer which has excellent fluidity and moldability, and also gives a molded product having excellent properties such as mechanical strength, and to a molded product obtained therefrom.

BACKGROUND ART

High-density polyethylene which is used in wide applications such as films, pipes, and bottle containers, has been conventionally prepared by using a Ziegler-Natta catalyst or a chromium catalyst. However, because of the nature of such catalysts, there has been limitation on the control of the molecular weight distribution or composition distribution of the polymer.

In recent years, several methods have been disclosed for preparation of an ethylene polymer having excellent moldability and mechanical strength, including an ethylene homopolymer or an ethylene/α-olefin copolymer of relatively small molecular weights and an ethylene homopolymer or an ethylene/α-olefin copolymer of a relatively large molecular weight, according to a continuous polymerization technique, using a single-site catalyst which facilitates the control of the composition distribution.

JP-A No. 11-106432 discloses a composition prepared by melt-blending a low molecular weight polyethylene with a high molecular weight ethylene/α-olefin copolymer, which is obtained by polymerization using a supported, geometric constraint type single-site catalyst (CGC/Borate-based catalyst). However, it is expected that sufficient mechanical strength would not be exhibited in the case of the carbon number being less than 6 according to the method disclosed in the above-mentioned patent application. Further, because the molecular weight distribution (Mw/Mn) of the single-stage polymerization product is broad, it is also expected that the mechanical properties of the product, such as impact strength, would be insufficient, as compared with the single-stage product having a narrower molecular weight distribution.

WO 01/25328 discloses an ethylene polymer which is obtained by solution polymerization in the presence of a catalyst system comprising $CpTiNP(tBu)_3Cl_2$ and borate or alumoxane. This ethylene polymer has a weak crystalline structure due to the presence of branches in the low molecular weight component, and thus it is expected that the polymer has poor mechanical strength.

EP 1201711 A1 discloses an ethylene polymer which is obtained by slurry polymerization in the presence of a catalyst system comprising ethylene bis(4,5,6,7-tetrahydro-1-indenyl)zirconium dichloride and methylalumoxane supported on silica. Among these ethylene polymers, a single-stage polymerization product has a wide molecular weight distribution (Mw/Mn), and thus it is expected that it would have insufficient impact strength and the like, as compared with a single-stage product of a narrower molecular weight distribution. Further, it is inferred that a broad molecular weight distribution means heterogeneity of the active species, and consequently there is a concern that the composition distribution broadens, thereby resulting in deterioration of long lifetime properties such as environmental stress cracking resistance (ESCR).

JP-A No. 2002-53615 discloses an ethylene polymer which is obtained by slurry polymerization using a catalyst system comprising methylalumoxane and a zirconium compound having a specific salicylaldimine ligand supported on silica. Although the patent application does not disclose the preferred range of the carbon number of α-olefin that is to be copolymerized with ethylene, in regard to the ethylene polymer obtained from 1-butene (number of carbon atoms=4) which is used as the α-olefin in Examples of the patent application, the carbon number envisaged to be too small to exhibit a sufficient mechanical strength.

The ethylene (co)polymer prepared using a Ziegler catalyst as described in Japanese Patent No. 821037, or the like has methyl branches in the molecular chain as a result of side production of methyl branches during the polymerization. It was found that these methyl branches were embedded in the crystal, thus weakening the crystal, and this caused deterioration of mechanical strength of the ethylene (co)polymer. Further, in regard to the copolymer of ethylene and an α-olefin, when the copolymer contained almost no α-olefin, a hard but brittle component was produced, while when an excessive amount of α-olefin was subject to copolymerization, a soft component with weak crystalline structure was produced, and thus it may cause tackiness due to broad composition distribution. Moreover, since the molecular weight distribution was broad, there were problems such as the phenomenon that a low molecular weight polymer adheres onto the surface of a molded product as a powdery substance, and so on.

The ethylene polymer that is obtained by polymerization using a metallocene catalyst as described in JP-A No. 9-183816, or the like causes side production of methyl branches during the polymerization, thereby lowering the mechanical strength.

An ethylene polymer which is obtained by polymerization using a chromium catalyst exhibits small extension of molecular chain because of the presence of a long chain branch, and thus has poor mechanical strength and long lifetime properties such as environmental stress cracking resistance (ESCR). Further, as a result of side production of a methyl branch during the polymerization, there exist methyl branch groups in the molecular chain. This has been a cause for lowering the mechanical strength.

The ethylene polymer which is obtained by polymerization using a constrained geometry catalyst (CGC) as described in WO 93/08221, or the like has methyl branches in the molecular chain, as a result of side production of a methyl branch during the polymerization. These methyl branches are embedded in the crystals, and thus weaken the crystalline structure. This has been a cause for lowering the mechanical strength. Further, the molecular extension of molecular chain was small because of the presence of long chain branches, and thus the mechanical strength and long lifetime properties such as environmental stress cracking resistance (ESCR) were insufficient.

An ethylene polymer which is obtained by high pressure radical polymerization has methyl branches or long chain branches in the molecular chain, as a result of side production of methyl branches or long chain branches during polymerization. These methyl branches are embedded in the crystals, thereby weakening the crystalline strength. This has been a cause for lowering the mechanical strength. Further, the presence of long chain branches resulted in small extension of molecular chain as well as a broad molecular weight distribution, and thus the long lifetime properties such as environmental stress cracking resistance (ESCR) were poor.

DISCLOSURE OF THE INVENTION

The present inventors have conducted an extensive research in view of the above conventional technology on an ethylene polymer which has excellent moldability, and also gives a molded product having excellent mechanical strength, and found that an ethylene polymer (E) containing 0.02 to 1.50 mol % of a constitutional unit derived from α-olefin having 6 to 10 carbon atoms and having the density of 945 to 975 kg/m$^3$, which satisfies both of the following requirements [1] and [2], has excellent moldability and also gives a molded product, especially a blow molded product, an extrusion molded product, and an injection molded product, having excellent mechanical strength and excellent appearance, thus completing the present invention.

[1] In CFC, all the components having a molecular weight of 100,000 or more are eluted at a temperature of 85° C. or higher.

[2] The components eluted at temperatures of 80° C. or lower account for up to 5% of all the components eluted in CFC.

The ethylene polymer (E) according to the present invention, which is suitably used for blow molding, preferably satisfies, in addition to the above-mentioned requirements, the following requirements [1b] to [4b] simultaneously:

[1b] the polymer contains 0.02 to 0.50 mol % of a constitutional unit derived from α-olefin having 6 to 10 carbon atoms;

[2b] the intrinsic viscosity ([η]) as measured in decalin at 135° C. is in the range of 1.6 to 2.8 (dl/g);

[3b] the flexural modulus, M MPa, as measured at 23° C. according to ASTM-D-790 satisfies 600≦M<1500, and the environmental stress cracking resistance (ESCR), T hr, as measured at 50° C. according to ASTM-D-1693 and above M satisfy the following equation (Eq-1):

$$T \geq -0.8 \times M + 1{,}210 \qquad \text{(Eq-1); and}$$

[4b] tanδ (loss modulus G"/storage modulus G') as measured at 190° C. and at an angular frequency of 100rad/sec using a dynamic viscoelasticity measuring apparatus, is in the range of 0.6 to 0.9.

Incidentally, hereinafter, the ethylene polymers as described above, that is, the ethylene polymers, which are very suitably used for blow molding, and satisfying the requirements [1], [2], [1b], [2b], [3b] and [4b] simultaneously, may be referred to as ethylene polymers (Eb).

In the case of employing the ethylene polymer (E) according to the present invention in the extrusion or injection molding applications, it is preferable that the polymer satisfies, in addition to the foregoing requirements, the following requirements [1e] to [5e] simultaneously:

[1e] the polymer contains 0.02 to 1.20 mol % of a constitutional unit derived from α-olefin having 6 to 10 carbon atoms;

[2e] the intrinsic viscosity ([η]) as measured in decalin at 135° C. is in the range of 2.0 to 3.0 (dl/g);

[3e] the apparent shear stress, as measured by a Capillary Rheometer at 210° C. and a shear rate of 194.57 sec$^{-1}$, is 7.0 MPa or less;

[4e] the actual stress obtained when it takes 10,000 cycles to fracture due to the tensile fatigue property as measured at 80° C. according to JIS K-6744, is from 11 to 17 MPa, and the actual stress obtained when it takes 100,000 cycles to fracture is from 9 to 16 MPa; and

[5e] the actual stress obtained when it takes 10,000 cycles to fracture due to the tensile fatigue property as measured at 23° C. with an unnotched specimen, is from 18 to 22 MPa, and the actual stress obtained when it takes 100,000 cycles to fracture is from 17 to 21 MPa.

Incidentally, the ethylene polymers as described above, that is, the ethylene polymers, which are suitably used for extrusion or injection molding, and satisfying the requirements [1], [2], [1e], [2e], [3e], [4e] and [5e] simultaneously, may be referred to as ethylene polymers (Ee) hereinafter.

The present invention relates to a blow molded product, an extrusion molded product, a compression molded product or a vacuum molded product, made from the ethylene polymer (E), the ethylene polymer (Eb) or the ethylene polymer (Ee). Preferred examples of the blow molded product include gasoline tanks, industrial chemical canisters, and bottle containers. Preferred examples of the extrusion molded product include pipes, electric wire coverings, and steel tube/steel wire coverings. Preferred examples of the injection molded product include pipe joints or automotive parts.

BEST MODE FOR CARRYING OUT THE INVENTION

Figure 1:
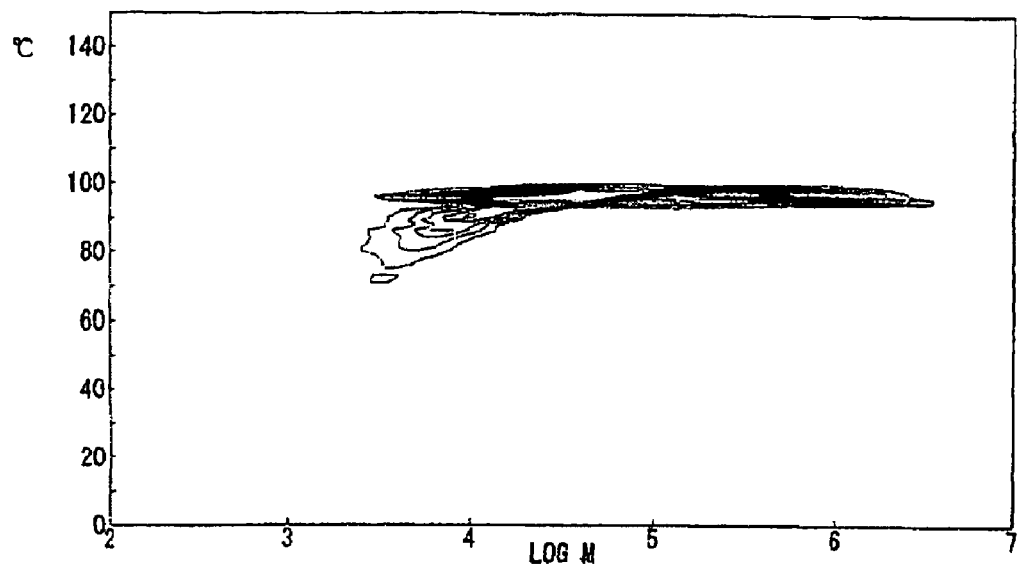
FIG. 1 is a CFC contour diagram for the ethylene polymer as described in Example $2_b$.

Hereinafter, the present invention will be described one after another, regarding the ethylene polymer (E), the ethylene polymer (Eb) which is suitably used for blow molding, and the ethylene polymer (Ee) which is suitably used for extrusion or injection molding, and then the blow molded product, the extrusion molded product, the compression molded product or the vacuum molded product, made from the ethylene polymer (E), the ethylene polymer (Eb) or the ethylene polymer (Ee) will be described.

Ethylene Polymer (E)

The ethylene polymer (E) according to the present invention is an ethylene polymer which contains 0.02 to 1.50 mol % of a constitutional unit derived from α-olefin having 6 to 10 carbon atoms, and usually comprises homopolymers of ethylene and copolymers of ethylene/α-olefin having 6 to 10 carbon atoms.

Herein, examples of α-olefin having 6 to 10 carbon atoms (hereinafter, may be simply referred to as "α-olefin") include 1-hexene, 4-methyl-1-pentene, 3-methyl-1-pentene, 1-octene, and 1-decene. According to the invention, it is preferred to use at least one selected from 1-hexene, 4-methyl-1-pentene and 1-octene among such α-olefins. When the α-olefin has 5 or less carbon atoms, the probability of the α-olefin being incorporated into the crystals increases (see Polymer, Vol. 31, p. 1999 (1990)), and consequently the strength is weakened, which is not desirable. When the α-olefin has more than 10 carbon atoms, the activation energy for fluidity becomes larger, and there occurs a large change in viscosity during molding, which is not desirable. Also, when the α-olefin has more than 10 carbon atoms, the side chain (the branch originating from the α-olefin copolymerized with ethylene) may sometimes undergo crystallization, thereby resulting in weakening of the non-crystalline part, which is not desirable.

The constitutional unit derived from α-olefin is contained in an amount of usually 0.02 to 1.50 mol %, and preferably 0.02 to 1.30 mol %. More preferable concentration varies according to the applications in which the ethylene polymer is used (the details of which will be described later).

The ethylene polymer (E) according to the present invention satisfies the following requirements [1] and [2] simultaneously for the cross fractionation chromatography (CFC).

Requirement [1]

The ethylene polymer (E) according to the invention is characterized in that all the components having a molecular weight of 100,000 or more are eluted at 85° C. or higher in cross fractionation chromatography (CFC). Now, the requirement [1] will be specifically described with reference to the results described in Examples. As determined by the CFC analysis of the ethylene polymer employed in Example $2_b$ described later, the temperature at which the component having a molecular weight (M) of 100,000 or more (that is, $LogM \geq 5.0$) starts eluting is 94° C., which satisfies the requirement [1]. The blow molded product made from the ethylene polymer exhibits good environmental stress cracking resistance (ESCR) as show in Table $3_b$. On the other hand, as determined by the CFC analysis of the ethylene polymer employed in Comparative Example 1b, the temperature at which the component having a molecular weight (M) of 100,000 or more (that is, $LogM \geq 5.0$) starts eluting is 83° C., which does not satisfy the requirement [1]. The blow molded product made from the ethylene polymer exhibits poorer balance between the stiffness (flexural modulus) and the environmental stress cracking resistance (ESCR), as compared with the ethylene polymer of Example $2_b$ as shown in Table $3_b$. That is, it was found that it is essential that the ethylene polymer of the present invention should satisfy the requirement [1], in order to provide a molded product with excellent performances such as stiffness and fluidity, and good balance of the long lifetime property therewith. In order to provide a molded product with performances such as stiffness and fluidity, and good balance of the long lifetime property therewith, it is preferable that the ethylene polymer of the present invention should satisfy the following requirement [2], in addition to the requirement [1].

Requirement [2]

Figure 2:
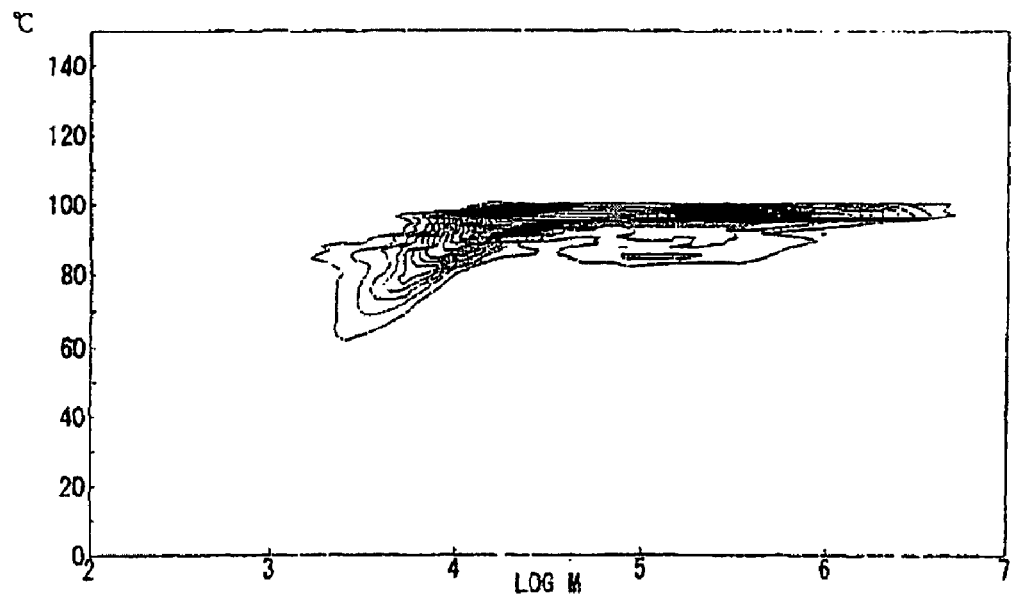
FIG. 2 is a CFC contour diagram for the ethylene polymer as described in Comparative Example $1_b$.

The ethylene polymer (E) according to the present invention is characterized in that 5% or less of all the components are eluted at 80° C. or lower in cross fractionation chromatography (CFC). (Here, "%" refers to the percentage of the total area of the peak attributable to the components eluted at 80° C. or lower, relative to the total area of the peak attributable to all the components). Now, the requirement [2] will be specifically described with reference to the results described in Examples. As determined by the CFC analysis of the ethylene polymer employed in Example $2_b$ described later, the proportion of the components eluted at 80° C. or lower in the all the components is 1.9%, which satisfies the requirement [2]. The blow molded product made from the ethylene polymer exhibits good balance between the stiffness (flexural modulus, bucking strength) and the environmental stress cracking resistance (ESCR) as show in Table $3_b$ and $4_b$. On the other hand, as determined by the CFC analysis of the ethylene polymer employed in Comparative Example 1b, the proportion of the components eluted at 80° C. or lower in the all the components is 7.1%, which does not satisfy the requirement [2]. The blow molded product made from the ethylene polymer exhibits poorer balance between the stiffness (flexural modulus, bucking strength) and the environmental stress cracking resistance (ESCR), as compared with the ethylene polymer of Example $2_b$, as show in Table $3_b$ and $4_b$. (Moreover, with reference to the requirements [1] and [2], the difference of the ethylene polymers as described in Example $2_b$ and Comparative Example $1_b$ can be understood qualitatively from the CFC contour diagram of FIGS. 1 and 2.)

It is meant by the ethylene polymer satisfying the requirements [1] and [2] that the α-olefin content of the high molecular weight components having a copolymerized α-olefin is small and the composition of α-olefin is uniform, or that the polymer does not contain any of such components which have relatively small molecular weights and also a short chain branch. In this case, a product molded therefrom is improved in long-term properties and the mechanical strength. The ethylene/α-olefin copolymer as described in JP-A No. 11-106432 has a wide composition distribution and thus does not satisfy the above-mentioned scope. The ethylene polymer as described in WO 01/25328 does not satisfy the above-mentioned scope because even a component with relatively small molecular weight also has a short chain branch resulting from copolymerization with an α-olefin.

The ethylene polymers of prior art prepared in the presence of a Ziegler catalyst or a chromium catalyst also have wide composition distributions and thus do not satisfy the above-mentioned scope. By setting the polymerization conditions as described later and using a catalyst system as described later, an ethylene polymer satisfying the requirements [1] and [2] can be prepared. Preferred examples of the ethylene polymers (E) can be mainly categorized to two types of the ethylene polymers, i.e., the ethylene polymer (Eb) which is suitably used for blow molding, and the ethylene polymer (Ee) which is suitably used for extrusion or injection molding. "Suitably used for a specific application" means that the substances fully exhibit their performances according to the present invention in the specific application, without limitation by other fields than the application field.

Ethylene Polymer (Eb)

The ethylene polymer (Eb) is an ethylene polymer which satisfies, in addition to the above-mentioned requirements [1] and [2], the following requirements [1b] to [4b], and is preferably used for blow molding.

Requirement [1b]

The ethylene polymer (Eb) usually contains 0.02 to 0.50 mol % of a constitutional unit derived from α-olefin having 6 to 10 carbon atoms. When the ethylene polymer (Eb) does not contain ethylene homopolymers, that is, when the polymer consists only of copolymers of ethylene and α-olefin having 6 to 10 carbon atoms, it is desirable that the constitutional unit derived from ethylene is present in a proportion of usually 99.50 to 99.98 mol %, preferably 99.80 to 99.98 mol %, and the repeating unit derived from the α-olefin is present in a proportion of usually 0.02 to 0.50 mol %, preferably 0.02 to 0.20 mol %. And, the ethylene polymer (Eb) may occasionally contain ethylene homopolymers, and in this case, it is desirable that the constitutional unit derived from ethylene in the ethylene/α-olefin copolymer part is present in a proportion of usually 97.50 to 99.96 mol %, preferably 99 to 99.96 mol %, and the repeating unit derived from the α-olefin is present in a proportion of usually 0.04 to 2.50 mol %, preferably 0.04 to 1.00 mol %. Here, even in the case of containing ethylene homopolymers, the repeating unit derived from the α-olefin is present in a proportion of usually 0.02 to 0.50 mol %, preferably 0.02 to 0.40 mol % based on the total polymer.

Requirement [2b]

The intrinsic viscosity ([η]) of the ethylene polymer (Eb) of the present invention as measured in decalin at 135° C. is in the range of 1.6 to 2.8 dl/g, and preferably from 1.8 to 2.8 dl/g. The ethylene polymer having its intrinsic viscosity within these ranges is excellent in mechanical strength, moldability, and the environmental stress cracking resistance (ESCR). For example, by changing the ratio of the amounts of hydrogen, ethylene and α-olefin fed to the polymerization reactor, the ratio of the polymerization amounts of ethylene homopolymer to ethylene/α-olefin copolymer, or the like, the values of intrinsic viscosity can be increased or decreased within the above-mentioned numerical ranges. Specifically, in the slurry polymerization of Example $2_b$ using hexane as a solvent, when polymerization is carried out under stirring to render the system homogeneous, the density and [η] become 962 kg/m$^3$ and 2.15 dl/g, respectively; when ethylene, hydrogen and 1-hexene are fed to the second polymerization reactor at the rates of 4.3 kg/hr, 3.0 N-liter/hr and 26 g/hr, respectively, the density and [α] become 967 kg/m$^3$ and 2.10 dl/g, respectively; and when ethylene and hydrogen are fed to the first polymerization reactor at the rates of 7.0 kg/hr and 40 N-liters/hr, respectively, and ethylene, hydrogen and 1-hexene are fed to the second polymerization reactor at the rates of 3.8 kg/hr, 4.5 N-liter/hr, and 180 g/hr, respectively, the density and [η] become 954 kg/m$^3$ and 2.43 dl/g, respectively.

Requirement [3b]

The ethylene polymer (Eb) according to the present invention has a flexural modulus, M MPa, as measured at 23° C. according to ASTM-D-790 which satisfies 600≦M<1500, and an environmental stress cracking resistance (ESCR), T hr, as measured at 50° C. according to ASTM-D-1693 and M, satisfy the following equation (Eq-1):

$$T \geq -0.8 \times M + 1{,}210 \quad \text{(Eq-1)}.$$

Such the ethylene polymer is stiff and tough, and thus the molded article obtained therefrom can be made thinner than conventional ones upon use. When multistage polymerization as described later is carried out using a catalyst system as described later, an ethylene polymer falling in the above range can be prepared by changing the proportions of hydrogen, ethylene and α-olefin fed to the polymerization reactor and thereby controlling the molecular weights and the proportions of polymerized amounts of the respective components. Specifically, when an ethylene polymer which has been polymerized under the conditions as described in Example $4_b$, the flexural modulus obtained is 1,490 MPa, and the ESCR is 177 hours up to 50% failure, or when the amount of hydrogen fed to the first polymerization reactor is changed from 75 N-liter/hr to 70 N-liter/hr, the amount of hydrogen fed to the second polymerization reactor is changed from 3.0 N-liter/hr to 4.0 N-liter/hr, and the amount of 1-hexene fed to the second polymerization reactor is changed from 52 g/hr to 65 g/hr under the conditions as described in Example $4_b$, the flexural modulus becomes 1,410 MPa, and the ESCR becomes 188 hours up to 50% failure.

Requirements [4b]

The ethylene polymer (Eb) according to the present invention preferably has a tanδ (loss modulus G"/storage modulus G') as measured at 190° C. and at an angular frequency of 100 rad/sec using a dynamic viscoelasticity measuring apparatus, in the range of 0.6 to 0.9. When tanδ falls within this range, the pinch-weldability of the blow molded product is excellent. As the molecular weight of the low molecular weight ethylene polymer is increased, and as the molecular weight of the high molecular weight ethylene/α-olefin copolymer is decreased or total molecular weight is decreased, tanδ tends to increase. Here, pinch-weldability refers to the ability of a resin being well attached to the welded parts with a bulge when molten resin extruded in the shape of tube from an extruder is welded between the molds. Larger tanδ means stronger viscosity, and in this case, the resin is thought to be susceptible to bulging.

Ethylene Polymer (Ee)

The ethylene polymer (Ee) is an ethylene polymer which satisfies, in addition to the above-mentioned requirements [1] and [2], the following requirements [1e] to [5e], and is preferably used for extrusion or injection molding.

Requirement [1e]

The ethylene polymer (Ee) usually contains 0.02 to 1.20 mol % of a repeating unit derived from α-olefin. When the ethylene polymer (Ee) does not contain ethylene homopolymers, that is, when the polymer consists only of copolymers of ethylene and α-olefin having 6 to 10 carbon atoms, it is desirable that the constitutional unit derived from ethylene is present in a proportion of usually 98.80 to 99.98 mol %, preferably 99.0 to 99.80 mol %, and the repeating unit derived from the α-olefin is present in a proportion of usually 0.02 to 1.2 mol %, preferably 0.02 to 1.00 mol %. And, the ethylene polymer (Ee) may occasionally contain ethylene homopolymers, and in this case, it is desirable that the constitutional unit derived from ethylene in the ethylene/α-olefin copolymer part is present in a proportion of usually 95 to 99.96 mol %, preferably 97.5 to 99.96 mol %, and the repeating unit derived from the α-olefin is present in a proportion of usually 0.04 to 5.00 mol %, preferably 0.04 to 2.50 mol %. Here, even in the case of containing ethylene homopolymers, the repeating unit derived from the α-olefin is present in a proportion of usually 0.02 to 1.20 mol %, preferably 0.02 to 1.00 mol % based on the total polymer.

Requirement [2e]

The intrinsic viscosity ([η]) of the ethylene polymer (Ee) of the present invention as measured in decalin at 135° C. is in the range of 2.0 to 3.0 dl/g, and preferably from 2.0 to 2.8 dl/g. The ethylene polymer having its density and intrinsic viscosity within these ranges is excellent in fluidity and mechanical strength, and the balance of stiffness and moldability. For example, by changing the ratio of the amounts of hydrogen, ethylene and α-olefin fed to the polymerization reactor, the ratio of the polymerization amounts of ethylene homopolymer to ethylene/α-olefin copolymer, or the like, the values can be increased or decreased within the above-mentioned numerical ranges. Specifically, in the slurry polymerization of Example $3_e$ using hexane as a solvent, when polymerization is carried out under stirring to render the system homogeneous, the density and [η] become 954 kg/m$^3$ and 2.49 dl/g, respectively; when ethylene, hydrogen and 1-hexene are fed to the second polymerization reactor at the rates of 3.8 kg/hr, 4.0 N-liter/hr and 180 g/hr, respectively, the density and [η] become 954 kg/m$^3$ and 2.85 dl/g, respectively; and when ethylene and hydrogen are fed to the first polymerization reactor at the rates of 5.0 kg/hr and 65 N-liters/hr, respectively, and ethylene, hydrogen and 1-hexene are fed to the second polymerization reactor at the rates of 3.9 kg/hr, 1.2 N-liter/hr, and 110 g/hr, respectively, the density and [α] become 958 kg/m$^3$ and 3.21 dl/g, respectively.

Requirement [3e]

The apparent shear stress of the ethylene polymer (Ee) of the present invention, as measured by a Capillary Rheometer at 210° C., and a shear rate of 194.57 sec$^{-1}$, is 7 MPa or less.

By using a capillary die having an inner diameter of 0.5 mm, and a capillary length of 3.0 mm, and a barrel of 9.55 mm, the ethylene polymer having an apparent shear stress, as measured at a shear rate of 194.57 sec$^{-1}$ in accordance with JIS K7199, falling within the above-described range, has a low resin pressure at a constant extrusion rate, i.e., a constant extrusion amount, and excellent extrusion characteristics. When multistage polymerization as described later is carried out using a catalyst system as described later, an ethylene polymer falling within the above-described range can be prepared by controlling the molecular weights of the respective components, the amount of the α-olefin to be copolymerized with ethylene, the composition distribution, and the ratio of polymerized amounts.

Requirements [4e]

The ethylene polymer (Ee) according to the present invention has an actual stress obtained when it takes 10,000 cycles to fracture due to the tensile fatigue property as measured at 80° C. with a notched specimen, in the range of 11 MPa to 17 Mpa, and an actual stress obtained when it takes 100,000 cycles to fracture in the range of 9 MPa to 16 MPa. An ethylene polymer with the tensile fatigue strength as measured at 80° C. with a notched specimen falling in the above-mentioned range, exhibits a brittle failure mode and has excellent long lifetime properties. When multistage polymerization as described later is carried out using a catalyst system as described later, an ethylene polymer falling within the above-described range can be prepared by controlling the molecular weights of the respective components, the amount of the α-olefin copolymerized with ethylene, the composition distribution, and the ratio of polymerized amounts.

Requirements [5e]

The ethylene polymer (Ee) according to the present invention has an actual stress obtained when it takes 10,000 cycles to fracture due to the tensile fatigue property as measured at 23° C. with an unnotched specimen, in the range of 18 MPa to 22 Mpa, and an actual stress obtained when it takes 100,000 cycles to fracture in the range of 17 MPa to 21 MPa. An ethylene polymer with the tensile fatigue strength as measured at 23° C. with an unnotched specimen falling in the above-mentioned range, exhibits a ductile failure mode and has excellent long lifetime properties. When multistage polymerization as described later is carried out using a catalyst system as described later, an ethylene polymer falling within the above-described range can be prepared by controlling the molecular weights of the respective components, the amount of the α-olefin copolymerized with ethylene, the composition distribution, and the ratio of polymerized amounts.

Process for Preparation of Ethylene Polymer

Hereinbelow, preferred method for preparation of the ethylene polymer of the present invention will be described, but the present invention is not limited thereto and encompasses other methods, as long as the above-described requirements are satisfied.

The ethylene polymer of the present invention can be preferably obtained by homopolymerizing ethylene or copolymerizing ethylene with α-olefin having 6 to 10 carbon atoms, using a catalyst for olefin polymerization that comprises:

(A) a transition metal compound in which a cyclopentadienyl group and a fluorenyl group are bonded to each other via a covalent bond bridge containing an atom of Group 14;

(B) at least one compound selected from:
(B-1) an organometallic compound,
(B-2) an organoaluminum oxy-compound, and
(B-3) a compound which forms an ion pair by reacting with a transition metal compound; and (C) a carrier. Preferred embodiment of each components (A), (B) and (C) used in the present invention will be described.

(A) Transition Metal Compound

The transition metal compound (A) is a compound represented by the following formulas (1) or (2):

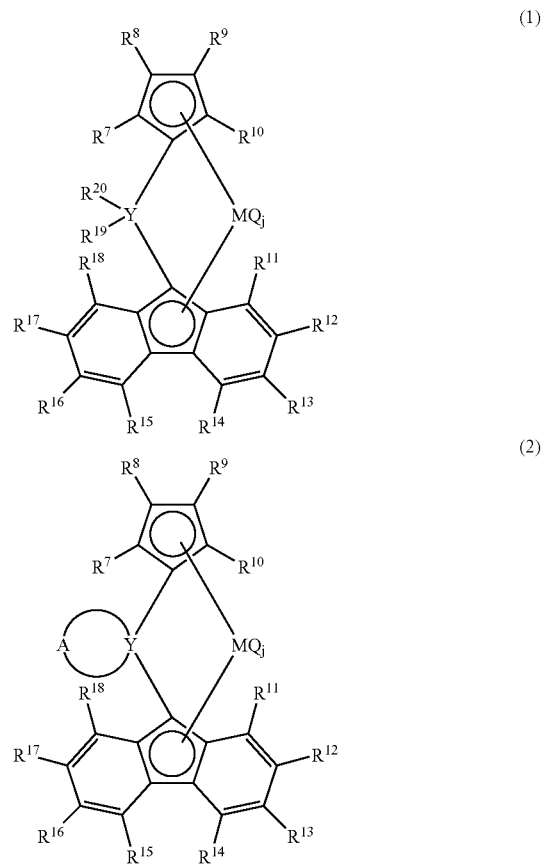

in which formulas (1) and (2), $R^7$, $R^8$, $R^9$, $R^{10}$, $R^{11}$, $R^{12}$, $R^{13}$, $R^{14}R^{15}$, $R^{16}$, $R^{17}$, $R^{18}$, $R^{19}$ and $R^{20}$ are selected from hydrogen atom, a hydrocarbon group, a halogen-containing hydrocarbon group and a silicon-containing hydrocarbon group, and may be the same or different from each other and the adjacent substituents $R^7$ to $R^{18}$ may be bonded to form a ring; A is a divalent hydrocarbon group having 2 to 20 carbon atoms which may contain a partially unsaturated bond and/or an aromatic ring, and forms a ring structure together with Y, and may contain two or more ring structures including the ring formed by A together with Y; Y is carbon or silicon; M is a metal selected from the atoms of Group 4 in the Periodic Table of Elements; Q may be selected from the same or different combinations of halogen, a hydrocarbon group, an anionic ligand, or a neutral ligand which can coordinate via an electron lone pair; and j is an integer between 1 and 4.

Among the transition metal compounds (A) represented by the aforementioned formula (1) or (2), those in which $R^7$ to $R^{10}$ are hydrogen, Y is carbon, M is Zr, and j is 2 are preferably used.

Among the transition metal compounds (A) represented by the aforementioned formula (I), those in which $R^{12}$, $R^{13}$, $R^{16}$, and $R^{17}$ are all hydrocarbon groups are preferably used.

Among the transition metal compounds (A) represented by the aforementioned formula (I), preferably used are the compounds wherein a bridging atom Y of the covalent bond bridging part has aryl groups which may be the same as or different from each other (that is, the compounds wherein $R^{19}$ and $R^{20}$ are aryl groups which may be the same as or different from each other). Examples of the aryl group include a phenyl group, a naphthyl group, and an anthracenyl group, or these groups having at least one aromatic hydrogen atom (sp² hydrogen) substituted with a substituent. Here, examples of the substituent include a hydrocarbon group (f1) having a total of 1 to 20 carbon atoms, a silicon-containing group ([2] having a total of 1 to 20 carbon atoms, and a halogen atom. Examples of the hydrocarbon group (f1) having a total of 1 to 20 carbon atoms includes, in addition to alkyl, alkenyl, alkynyl, and aryl groups which consist of carbon and hydrogen only, a heteroatom-containing hydrocarbon group in which parts of the hydrogen atoms directly bonded to such carbon atoms are substituted with a halogen atom, an oxygen-containing group, a nitrogen-containing group, or a silicon-containing group, and the hydrocarbon group in which any two neighboring hydrogen atoms form an alicyclic group. Examples of the hydrocarbon group (f1) include a straight-chain hydrocarbon group such as a methyl group, an ethyl group, an n-propyl group, an allyl group, an n-butyl group, an n-pentyl group, an n-hexyl group, an n-heptyl group, an n-octyl group, an n-nonyl group, and an n-decanyl group; a branched hydrocarbon group such as an isopropyl group, a t-butyl group, an amyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group, and a 1-methyl-1-isopropyl-2-methylpropyl group; a cyclic saturated hydrocarbon group such as a cyclopentyl group, a cyclohexyl group, a cycloheptyl group, a cyclooctyl group, a norbornyl group, and an adamantyl group; a cyclic unsaturated hydrocarbon group such as a phenyl group, a naphthyl group, a biphenyl group, a phenanthryl group, and an anthracenyl group and a nuclear-alkylsubstituted form thereof; a saturated hydrocarbon group substituted with an aryl group, such as a benzyl group, and a cumyl group; and a heteroatom-containing hydrocarbon group such as a methoxy group, an ethoxy group, a phenoxy group, an N-methylamino group, a trifluoromethyl group, a tribromomethyl group, a pentafluoroethyl group and pentafluophenyl group.

The term "silicon-containing group ([2]" means a group, e.g., in which ring carbons of the cyclopentadienyl group are directly covalently bonded to a silicon atom, and specific examples thereof include an alkyl silyl group and an aryl silyl group. Examples of the silicon-containing group ([2] having a total of 1 to 20 carbon atoms include a trimethylsilyl group, and a triphenylsilyl group.

Specific examples of the aryl group which may be the same as or different from each other, with which the bridging atom Y of the covalent bond bridging part is bonded, include a phenyl group, a tolyl group, a t-butylphenyl group, a dimethylphenyl group, a biphenyl group, a cyclohexylphenyl group, a (trifluoromethyl)phenyl group, a bis(trifluoromethyl)phenyl group, a chlorophenyl group and a dichlorophenyl group.

The transition metal compound (A) used in the Examples of the present application as described later is specifically represented by the following formulas (3) and (4), but the present invention is not limited to these transition metal compounds.

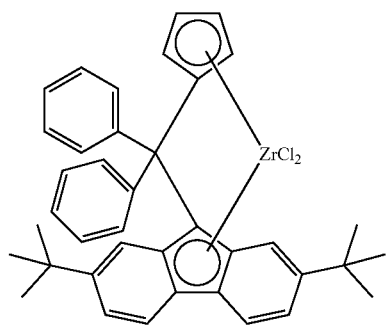

(3)

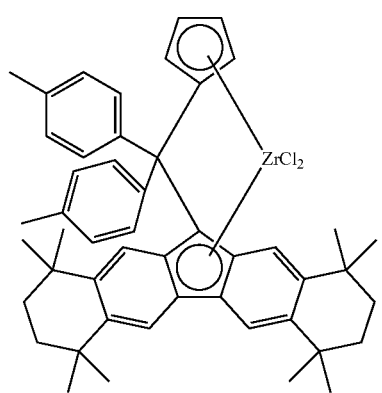

(4)

Here, the structures of the transition metal compounds represented by the above formulas (3) and (4) were determined by 270 MHz¹H-NMR (JEOL, GSH-270) and FD-mass analysis (JEOL, SX-102 A).

(B-1) Organometallic Compound

Examples of the organometallic compound (B-1) optionally used in the present invention, specifically include the following organometallic compounds having the metals from Groups 1, 2, 12 and 13 of the Periodic Table of Elements. It is an organoaluminum compound represented by the following formula:

wherein $R^a$ and $R^b$ may be the same or different and each represent a hydrocarbon group having 1 to 15, preferably 1 to 4 carbon atoms; X represents a halogen atom; m is a number such that $0<m\leq3$, n is a number such that $0\leq n<3$, p is a number such that $0\leq p<3$, and q is a number such that $0\leq q<3$, while m+n+p+q=3.

The aluminum compound used in the below-described Examples of the present invention is triisobutylaluminum or triethylaluminum.

(B-2) Organoaluminum Oxy-compound

The organoaluminum oxy-compound (B-2) optionally used in the present invention may be a conventionally known aluminoxane, or a benzene-insoluble organoaluminum oxy-compound as illustrated in the publication of JP-A No. 2-78687.

The organoaluminum oxy-compound used in the below-described Examples of the present invention is a commercially available MAO (=methylalumoxane)/toluene solution manufactured by Nippon Aluminum Alkyls, Ltd.

(B-3) Compound Forming an Ion Pair by Reacting with a Transition Metal Compound

The compound (B-3) which forms an ion pair by reacting with the bridged metallocene compound (A) of the present invention (hereinafter, referred to as an "ionizing ionic compound") may include the Lewis acids, ionic compounds, borane compounds, carborane compounds and the like described in the publications of JP-A No. 1-501950, JP-A NO. 1-502036, JP-A NO. 3-179005, JP-A NO. 3-179006, JP-A NO. 3-207703, JP-A NO. 3-207704, U.S. Pat. No. 5,321,106, and the like. It may further include heteropoly compounds and isopoly compounds. Such ionizing ionic compounds (B-3) are used independently or in combination of two or more kinds. Incidentally, as for compound (B), the above-described two compounds (B-1) and (B-2) are used in the below-described Examples of the present invention.

(C) Microparticulate Carrier

The microparticulate carrier (C) optionally used in the present invention is a solid product in the form of granules or microparticles consisting of an inorganic or organic compound. Among such compounds, preferred as the inorganic compound are porous oxides, inorganic halides, clay, clay minerals or ion-exchangeable lamellar compounds. The porous oxides vary in the nature and state depending on the kind and method of preparation, but the carrier which is preferably used in the invention has a particle size of from 1 to 300 μm, preferably from 3 to 200 μm, a specific surface area ranging from 50 to 1000 $m^2/g$, preferably from 100 to 800 $m^2/g$, and a pore volume ranging from 0.3 to 3.0 $cm^3/g$. Such carrier is used after being calcined at a temperature of from 80 to 1000° C., and preferably from 100 to 800° C., if necessary. Incidentally, if not specified otherwise, the carrier used in the below-described Examples of the invention was $SiO_2$ manufactured by Asahi Glass Co., Ltd., which has an average particle size of 12 μm, a specific surface area of 800 $m^2/g$ and a pore volume of 1.0 $cm^3/g$.

The catalyst for olefin polymerization according to the present invention may contain a specific organic compound component (D) as described later, if necessary, together with the bridged metallocene compound (A), at least one compound (B) selected from (B-1) an organometallic compound, (B-2) an organoaluminum oxy-compound and (B-3) an ionizing ionic compound, and optionally the microparticulate carrier (C) of the present invention.

(D) Organic Compound Component

According to the present invention, the organic compound component (D) is optionally used for the purpose of improving the polymerization performance and the properties of produced polymer. Such organic compound may be exemplified by alcohols, phenolic compounds, carboxylic acids, phosphorous compounds and sulfonic acid salts etc.

The ethylene polymer according to the present invention can be obtained by homopolymerizing ethylene or copolymerizing ethylene with α-olefin having 6 to 10 carbon atoms as described above, using a catalyst for olefin polymerization as described.

Upon polymerization, the usage and order of addition for the respective components are arbitrarily selected, but the following methods (P1) to (P10) may be illustrated.

(P1) A method of adding component (A) and at least one component (B) selected from (B-1) an organometallic compound, (B-2) an organoaluminum oxy-compound and (B-3) an ionizing ionic compound (hereinafter, simply referred to as "component (B)") to the polymerization reactor in an arbitrary order.

(P2) A method of adding a catalyst in which component (A) has been preliminarily brought into contact with component (B), to the polymerization reactor.

(P3) A method of adding component (B) and a catalyst component in which component (A) has been preliminarily brought into contact with component (B), to the polymerization reactor in an arbitrary order. In this case, the respective components (B) may be the same or different.

(P4) A method of adding component (B) and a catalyst component having Component (A) supported on the microparticulate carrier (C) to the polymerization reactor in an arbitrary order.

(P5) A method of adding a catalyst having component (A) and component (B) both supported on microparticulate carrier (C) to the polymerization reactor.

(P6) A method of adding component (B) and a catalyst component having component (A) and component (B) both supported on microparticulate carrier (C) to the polymerization reactor in an arbitrary order. In this case, the respective components (B) may be the same or different.

(P7) A method of adding component (A) and a catalyst component having Component (B) supported on microparticulate carrier (C) to the polymerization reactor in an arbitrary order.

(P8) A method of adding component (A), component (B) and a catalyst component having component (B) supported on microparticulate carrier (C) to the polymerization reactor in an arbitrary order. In this case, the respective components (B) may be the same or different.

(P9) A method of adding a catalyst component that has been formed by preliminarily contacting component (B) with a catalyst having component (A) and component (B) both supported on microparticulate carrier (C), to the polymerization reactor. In this case, the respective components (B) may be the same or different.

(P10) A method of adding component (B) and a catalyst component that has been formed by preliminarily contacting component (B) with a catalyst having Component (A) and Component (B) both supported on microparticulate carrier (C), to the polymerization reactor in an arbitrary order. In this case, the respective components (B) may be the same or different.

With respect to each of the above-described methods (P1) to (P10), the catalyst component may have at least two or more of the respective components preliminarily brought into contact.

The above-mentioned solid catalyst component having component (A) and component (B) both supported on microparticulate carrier (C) may be prepolymerized with an olefin. This prepolymerized solid catalyst component has a constitution in which polyolefin is usually prepolymerized in a proportion of from 0.1 to 1000 g, preferably from 0.3 to 500 g, and particularly preferably from 1 to 200 g, relative to 1 g of the solid catalyst component.

Further, for the purpose of facilitating polymerization, an antistatic agent or an anti-fouling agent may be used in combination or supported on the carrier.

Polymerization can be carried out either by liquid-phase polymerization such as solution polymerization, slurry polymerization or the like, or by gas-phase polymerization, and particularly slurry polymerization and gas-phase polymerization are preferably employed from the viewpoint of productivity.

Examples of the inactive hydrocarbon medium used in liquid-phase polymerization specifically include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures thereof, and the olefin itself can be also used as the solvent.

When (co)polymerization is carried out using a catalyst for olefin polymerization as described above, Component (A) is typically used in an amount of from $10^{-12}$ to $10^{-2}$ mole, and preferably from $10^{-10}$ to $10^{-3}$ mole, relative to 1 liter of the reaction volume.

Component (B-1) which is optionally employed is used in an amount such that the molar ratio [(B-1)/M] of component (B-1) to the transition metal atom (M) in Component (A) would be typically from 0.01 to 100,000, and preferably from 0.05 to 50,000.

Component (B-2) which is optionally employed is used in an amount such that the molar ratio [(B-2)/M] of the aluminum atom in component (B-2) to the transition metal atom (M) in Component (A) would be typically from 10 to 500,000, and preferably from 20 to 100,000.

Component (B-3) which is optionally employed is used in an amount such that the molar ratio [(B-3)/M] of component (B-3) to the transition metal atom (M) in Component (A) would be typically from 1 to 100, and preferably from 2 to 80.

Component (D) which is optionally employed is used in an amount such that when Component (B) is component (B-1), the molar ratio [(D)/(B-1)] would be typically from 0.01 to 10, preferably from 0.1 to 5, and when Component (B) is component (B-2), the molar ratio [(D)/(B-2)] would be typically from 0.001 to 2, and preferably from 0.005 to 1, and when Component (B) is component (B-3), the molar ratio [(D)/(B-3)] would be typically from 0.01 to 10, and preferably from 0.1 to 5.

The temperature is typically in the range of −50 to 250° C., preferably 0 to 200° C., and particularly preferably 60 to 170° C. The polymerization pressure is typically from atmospheric pressure to 100 kg/cm², and preferably from atmospheric pressure to 50 kg/cm², and the polymerization reaction can be carried out in either of the batch mode, semi-continuous mode and continuous mode. Polymerization is usually carried out in a gas phase or in a slurry phase in which polymer particles are precipitated out in a solvent. Furthermore, polymerization is carried out in two or more stages with different reaction conditions. In this case, it is preferably carried out in the batch mode. Also, in the case of slurry polymerization or gas phase polymerization, the polymerization temperature is preferably from 60 to 90° C., and more preferably from 65 to 85° C. By carrying out the polymerization within this temperature range, an ethylene polymer with narrower composition distribution can be obtained. A polymer obtained as such is in the form of a particle with a diameter of tens to thousands of μmϕ. In the case of polymerization in the continuous mode in two or more polymerization reactors, an operation such as precipitation in a poor solvent after dissolution in a good solvent, sufficient melt-kneading in a specific kneader, or the like is required.

When the ethylene polymer according to the present invention is prepared, for example, in two stages, an ethylene homopolymer having an intrinsic viscosity of 0.3 to 1.8 dl/g is prepared in the former stage, and a (co)polymer having an intrinsic viscosity of 3.0 to 10.0 dl/g is prepared in the later stage. This order may be reversed.

Since the catalyst for olefin polymerization has extremely high polymerization performance even for the α-olefin (e.g., 1-hexene) to be copolymerized with ethylene, there would be needed a device not to produce a copolymer with excessively high α-olefin content, after completion of predetermined polymerization. For example, mention may be made of methods such as, when the contents of the polymerization reactor is withdrawn from the polymerization reactor, simultaneously or as immediately as possible, (i) separating the polymer, solvent and unreacted α-olefin with a solvent separator, (ii) adding an inert gas such as nitrogen and the like to the contents compulsorily to discharge the solvent and unreacted α-olefin out of the system, (iii) controlling the pressure applied to the contents compulsorily to discharge the solvent and unreacted α-olefin out of the system, (iv) adding a large quantity of solvent to the contents to dilute the unreacted α-olefin to a concentration at which substantially no polymerization takes place, (v) adding a substance which deactivates the catalyst for polymerization, such as methanol and the like, (vi) cooling the contents to a temperature at which substantially no polymerization takes place, or the like. These methods may be carried out independently or in combination of several methods.

The molecular weight of the obtained ethylene polymer can be controlled by adding hydrogen to the polymerization system or by changing the polymerization temperature. It can be also controlled by means of the difference in components (B) used.

The polymer particles obtained by polymerization reaction may be pelletized by the following methods:

(1) a method of mechanically blending the ethylene polymer particles with other components that are optionally added in an extruder, a kneader or the like, and cutting into predetermined sizes; and (2) a method of dissolving the ethylene polymer and other components that are optionally added in a suitable good solvent (e.g., hydrocarbon solvents such as hexane, heptane, decane, cyclohexane, benzene, toluene, xylene and the like), subsequently removing the solvent, then mechanically blending the components using an extruder, a kneader or the like, and cutting into predetermined sizes.

The ethylene polymer according to the present invention may be blended, as desired, with additives such as a weather-resistant stabilizer, a heat-resistant stabilizer, antistatic agent, an anti-slipping agent, an anti-blocking agent, an anti-fogging agent, a lubricant, a dye, a nucleating agent, a plasticizer, an anti-aging agent, a hydrochloric acid absorbent, an anti-oxidizing agent and the like, pigments such as carbon black, titanium oxide, titanium yellow, phthalocyanine, isoindolinone, a quinacridone compound, a condensed azo compound, ultramarine blue, cobalt blue and the like without adversely affecting the purpose of the present invention.

Molded Product Made from Ethylene Polymer

The ethylene polymer according to the present invention can be molded into a blow molded product, an inflation molded product, a cast molded product, a laminated extrusion molded product, an extrusion molded product such as a pipe or irregular shapes, an expansion molded product, an injection molded product, a vacuum molded product or the like. Further, the polymer can be used in the form of a fiber, a monofilament, a non-woven fabric or the like. These products include those molded products comprising a portion consisting of an ethylene polymer and another portion consisting of another resin (laminated products, etc.). Moreover, this ethylene polymer may be used in the state of being crosslinked during molding. The ethylene polymer according to the present invention gives excellent properties when used in a blow molded product an extrusion molded product and an injection molded product, among the above-mentioned molded products, thus it being desirable.

Preferred examples of the blow molded products according to the present invention include bottle containers, industrial chemical canisters, and bottle containers.

The hollow molded products as prepared by the above method are suitable as bleaching agent containers, detergent containers, softening containers, or the like and used as, for example, containers for cosmetics, laundry detergents, domestic detergents, softening finishes, shampoos, rinses, or conditioners. Also, they can be used as kerosene cans, gasoline tanks for electricity generators, lawn mowers, motorcycles, automotives, or the like, cans for agrochemicals or medicines, drum cans, or the like.

Further, the hollow molded products can be used for storage of foods such as mayonnaise and edible oils, or medicines.

In these applications, multilayered molded products are preferably used for suppressing the oxidation of the foods, or the permeation of the contents such as gasoline.

Preferred examples of the extrusion molded product include pipes, electric wire coverings, and steel tube/steel wire coverings. The extrusion molded products as prepared by the above method can be used as gas pipes, water-supply and sewerage pipes, pipes for transporting agricultural water or industrial water, pipes for protecting various contents such as information communication facilities such as optical fibers. Further, they may be used as steel pipe coverings which is preventing corrosion on the inside of the cast iron pipes, or steel wire coverings for protecting the wires for supporting the buildings. It is required that these extrusion molded products be not susceptible to fracture in a short or long term, thus, it is effective to use the resin of the present invention in order to make the product life even longer.

Preferred examples of the injection molded product include pipe joints or automotive parts. The pipe joints or automotive parts are preferably used as fused into the hollow molded product or the extrusion molded product. Examples of the pipe joint include methods of fusion such as electrofusion joint, and heatfusion joint, and various forms of joints by connecting or branching the pipes according to the purposes, any of which can be preferably used due to its moldability and physical properties, in particular long-term non-breakage. Particularly, the products of the present invention are effectively used from the viewpoint of enhancing the long-term reliability of the parts to be fused with the main body of the pipes prepared by the extrusion molding, and against the breakage of the welded part.

A large number of the parts of the automotives are used to improve the functionality of the gasoline tanks as a hollow molded product, which are thus commonly used as fused parts. By using the products of the present invention, the long-term reliability of the weld parts and the fused parts can be improved.

EXAMPLES

The present invention is described in more detail with reference to the following examples, but the present invention is not limited by the examples. Here, measurement of various properties and preparation of samples for measurement as described herein were made by the following methods.

Preparation of Sample for Measurement

To 100 parts by weight of an ethylene polymer in the particulate form, 0.20 part by weight of tri(2,4-di-t-butylphenyl)phosphate as a secondary anti-oxidizing agent, 0.20 part by weight of n-octadecyl-3-(4'-hydroxy-3',5'-di-t-butylphenyl)propionate as a heat-resistant stabilizer, and 0.15 part by weight of calcium stearate as a hydrochloric acid absorbent were blended. Thereafter, a sample for measurement was prepared by pelletization at a resin extrusion amount of 25 kg/hr and at a set temperature of 200° C. using a single screw extruder (screw diameter 65 mm, L/D=28, screen mesh #40/#60/#300×4/#60/#40) manufactured by Placo Co., Ltd.

Measurement of Ethylene Content and α-olefin Content

The ethylene content and the α-olefin content in the molecular chain of the ethylene polymer were measured by $^{13}$C-NMR. Measurement was made using a Lambda 500-type nuclear magnetic resonance unit ($^1$H: 500 MHz) manufactured by JEOL, Ltd, with an integral number of 10,000 to 30,000. A commercially available quartz glass tube for NMR measurement with a diameter of 10 mm was charged with 250 to 400 mg of the sample and 2 ml of ultra pure grade hexachlorobutadiene (Wako Pure Chemical Industries, Ltd.), and the mixture was heated at 120° C. and uniformly dispersed to a solution, which was subjected to NMR measurement. The assignment of each absorption in the NMR spectrum was based on "NMR—General Remarks and Guidelines to Experimentation [I]," Kagaku no Ryoiki, extra edition No. 141, pp. 132-133. Measurement of the sample was made under the measurement conditions such as a measurement temperature of 120° C., a measurement frequency of 125.7 MHz, a spectrum width of 250,000 Hz, a pulse repetition time of 4.5 seconds, and 45° pulse.

Cross Fractionation Chromatography (CFC)

The following measurement was made using a CFC T-150A type manufactured by Mitsubishi Petrochemical Co., Ltd. The separation column consisted of three Shodex AT-806 MS, the eluent was o-dichlorobenzene, the sample concentration was 0.1 to 0.3 wt/vol %, the injected amount was 0.5 ml, and the flow rate was 1.0 ml/min. The sample was heated at 145° C. for 2 hours, subsequently cooled to 0° C. at a rate of 10° C./hr and further maintained at 0° C. for 60 min to be coated with the sample. The capacity of the temperature rising elution column was 0.86 ml, and the line capacity was 0.06 ml. As for the detector, an infrared spectrometer MIRAN 1A CVF type (CaF$_2$ cell) manufactured by FOXBORO, Inc. set in the absorbance mode with a response time of 10 seconds, was used to detect an infrared ray of 3.42 μm (2924 cm$^{-1}$). The elution temperature was such that the range of 0° C. to 145° C. was divided into 35 to 55 fractions, and particularly in the vicinity of an elution peak, the temperature was divided into fractions corresponding to 1° C. each. The indication of the temperature is all in integers, and for example, an elution fraction at 90° C. indicates a component eluted at 89° C. to 90° C. The molecular weights of the components not coated even at 0° C. and the fraction eluted at each temperature were measured, which were converted to the molecular weights in terms of PE using a standard calibration curve. The SEC temperature was 145° C., the amount of injected of the internal standard was 0.5 ml, the position of injection was at 3.0 ml, and the data sampling time interval was 0.50 second. Here, when pressure abnormality occurred due to the presence of too many eluted components within a narrow temperature range, the sample concentration would be set to less than 0.1 wt/vol %. Data processing was carried out by means of an analysis program attached to the apparatus, "CFC Data Processing (version 1.50)." Although cross fractionation chromatography (CFC) per se is said to be an analytic method of reproducing the results with high analytic precision as far as the conditions for measurement are strictly maintained constant, the measurements were performed in several times to take the average in Examples of the present invention.

Weight Average Molecular Weight (Mw), Number Average Molecular Weight (Mn) and Molecular Weight Curve Measurement was carried out as follows using a GPC-150C manufactured by Waters Corp. The separating columns used were TSKgel GMH6-HT and TSKgel GMH6-HTL, the column size was each an inner diameter of 7.5 mm and a length of 600 mm, the column temperature was 140° C., the mobile phase was o-dichlorobenzene (Wako Pure Chemicals Industry, Ltd.) containing 0.025% by weight of BHT (Takeda Pharmaceutical Co., Ltd.) as the anti-oxidizing agent, at a flow rate of 1.0 ml/min, the sample concentration was 0.1% by weight, the amount of sample injected was 500 µl, and the detector used was a differential refractometer. For the standard polystyrene, a product by Tosoh Corporation was used for the molecular weight of $Mw<1,000$ and $Mw>4\times10^6$, and a product by Pressure Chemical Co. for the molecular weight of $1,000 \leqq Mw \leqq 4\times10^6$. The molecular weight was a value determined in terms of polyethylene by means of universal calibration.

Intrinsic Viscosity ([η])

This is a value measured at 135° C. using decalin as the solvent. That is, about 20 mg of granulated pellets is dissolved in 15 ml of decalin, and the specific viscosity $\eta_{sp}$ is measured in an oil bath at 135° C. This decalin solution is diluted by further adding 5 ml of the decalin solvent, and then the specific viscosity $\eta_{sp}$ is measured in the same manner. This dilution procedure is further repeated two times to determine the value of $\eta_{sp}/C$ as the intrinsic viscosity (see the following formula), with the concentration (C) being extrapolated to zero.

$$[\eta] = \lim(\eta_{sp}/C) \; (C \to 0)$$

Density (d)

A specimen for measurement was prepared by molding a sheet having a thickness of 0.5 mm (spacer-shaped; 9 sheets of 45×45×0.5 mm obtained from a sheet of 240×240×0.5 mm) under a pressure of 100 kg/cm² using a hydraulic thermal press machine manufactured by Shinto Metal Industries, Ltd. set at 190° C., and cooling the obtained sheet via compressing it under a pressure of 100 kg/cm² using another hydraulic thermal press machine manufactured by Shinto Metal Industries, Ltd. set at 20° C. The heating plate used was an SUS plate with a thickness of 5 mm. This pressed sheet was subjected to heat treatment at 120° C. for one hour and gradual cooling to room temperature linearly over 1 hour, and then the density was measured using a density gradient column.

Measurement of Melt Flow Rate (MFR)

The MFR was measured according to the method of ASTM D1238-89 at 190° C. under a load of 5 kg and 2.16 kg.

Environmental Stress Cracking Resistance Test for Pressed Sheet: ESCR (hr)

A specimen for measurement was prepared by molding a sheet having a thickness of 2 mm (spacer-shaped; 4 sheets of 80×80×2 mm from a sheet of 240×240×2 mm) under a pressure of 100 kg/cm² using a hydraulic thermal press machine manufactured by Shinto Metal Industries, Ltd. set at 190° C., and cooling the obtained sheet via compressing it under a pressure of 100 kg/cm² using another hydraulic thermal press machine manufactured by Shinto Metal Industries, Ltd. set at 20° C. The heating plate used was an SUS plate with a thickness of 5 mm. From the above pressed sheet of 80×80×2 mm, a dumbbell-shaped specimen with a size of 13 mm×38 mm was punched out to provide a sample for evaluation. The test for the property of environmental stress cracking resistance (ESCR) was performed according to ASTM D1693. The conditions for evaluation (bent strip method) are summarized in the following:

Shape of sample: Press molding method C
Specimen: 38×13 mm, Thickness: 2 mm (HDPE)
Notch length: 19 mm, Depth: 0.35 mm
Testing temperature: 50° C., constant temperature water bath: capable of controlling at 50.0±0.5° C.

Holding of sample: The sample is set using a clinching device exclusively used for a specimen holder with an inner dimension of 11.75 mm and a length of 165 mm.

Surfactant: Nonylphenyl polyoxyethylene ethanol (commercially available under the product name of Antarox CO-630) is diluted with water to a concentration of 10% for use.

Method of evaluation: time to fracture F50 (time to 50% fracture) is determined using logarithmic probability paper.

Test on Flexural Modulus of Pressed Sheet

This was measured by the method in accordance with the section "Flexural Modulus" of "General Properties and Test conditions therefor" in JIS K6922-2 (Table 3), and the test method of Flexural Modulus as described in JIS K7171. Specifically, from a pressed sheet having a thickness 4 mm, obtained at a temperature of 40° C. under the conditions of a molding temperature of 180° C., and an average cooling rate of 15° C./min, a specimen with a length 80 mm, a width 10 mm, and a thickness 4 mm was punched out, and the flexural modulus was measured under the conditions of a testing temperature of 23° C., a bending span distance of 64 mm, and a test rate of 2.0 mm/min.

tan δ (=Loss Modulus G"/Storage Modulus G')

Detailed information on tan δ is described in, for example, "Lecture on Rheology", by Japan Society of Rheology, Kobunshi Kankokai, pp. 20-23. The measurement was carried out by measuring the angular frequency (ω(rad/sec)) dispersion of the storage modulus G' (Pa) and the loss modulus G" (Pa) using a rheometer RDS-II manufactured by Rheometrics Inc. The sample holder used was a pair of parallel plates with 25 mmφ, and the sample thickness was about 2 mm. Under the measuring temperature of 190° C., G' and G" were measured within the range of $0.04 \leqq \omega \leqq 400$. The measurement was obtained at five points per one digit of ω. The amount of strain was suitably selected within the range of 2 to 25%, under the conditions that the torque is detectable within the range for measurement, and no torque-over occurs.

Preparation of Bottle for the Measurement of Buckling Strength and Environmental Stress Cracking Resistance (ESCR) Property and the Observation of Pinch-Off Property of Bottle Using an extrusion blow molding machine (model: 3B 50-40-40) manufactured by Placo Co., Ltd., blow molding was carried out under the following conditions: set temperature: 180° C., die diameter: 23 mmφ, core diameter: 21 mmφ, amount extruded: 12 kg/hr, mold temperature: 25° C., rate of clamping: 1.4 sec, clamping pressure: 5.5 t, and blow air pressure: 5 kg/cm². Thus, a cylindrical bottle having a capacity of 1,000 cc and a net weight of 50 g was obtained.

Environmental Stress Cracking Resistance (ESCR) Property of Bottle

The bottle prepared as above was charged with 100 cc of Kitchen Hiter manufactured by Kao Corp., and then was sealed at the opening with resin. The bottle and the contents were maintained in an oven at 65° C. to observe the time to fracture. Thus, the time to fracture F50 was determined using logarithmic probability paper.

Pinch-Off Property of Bottle (Measurement of the Thickness Ratio of Pinched Part)

Figure 5:
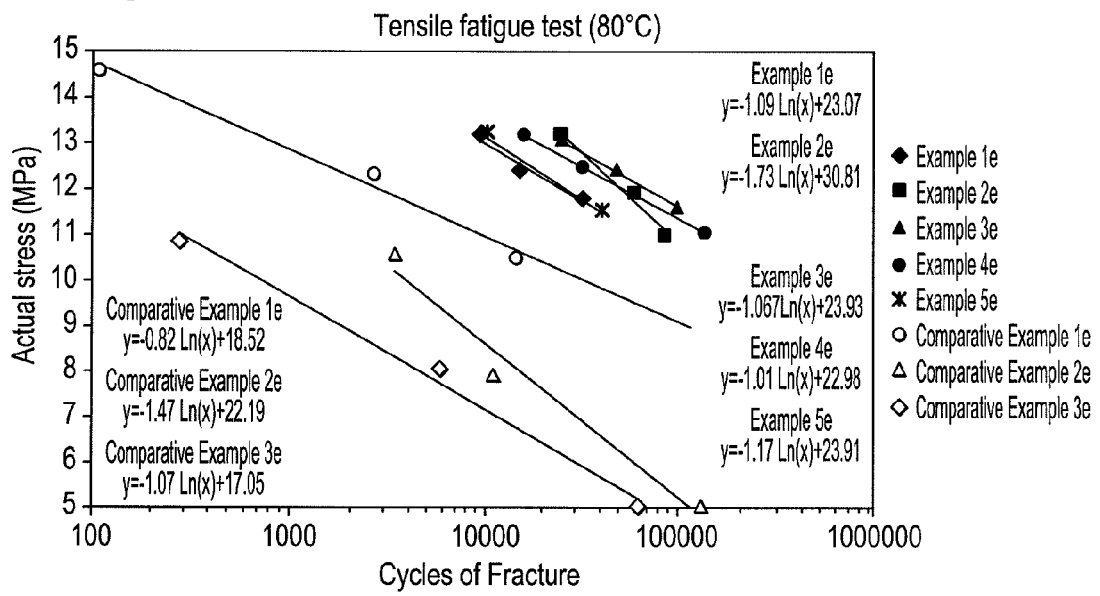
FIG. 5 is a chart indicating the comparison of results of the tensile fatigue test at 80° C. for Examples and Comparative Examples.
Figure 6:
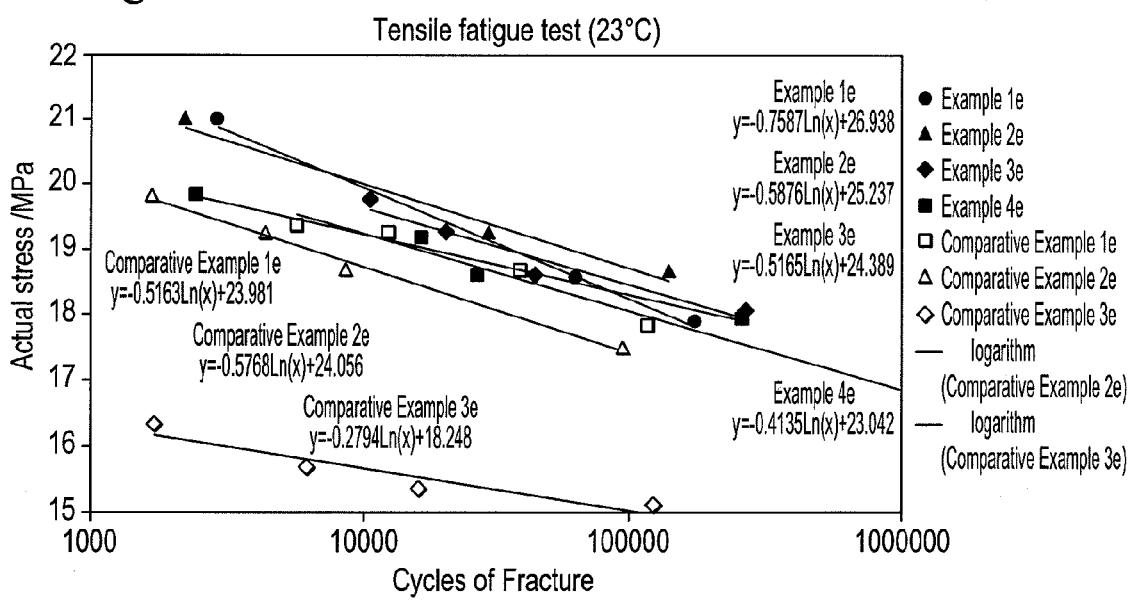
FIG. 6 is a chart indicating the results of the tensile test at 23° C. for Examples and Comparative Examples.

When the bottom of the bottle obtained by blow molding as described above was cut in the direction perpendicular to the matching surface of the mold, the thickness ratio of the pinched part is represented by (a/b), wherein a represents the thickness at the central part of the bottle, and b represents the thickness at the thickest part. As this value is larger, the state of pinching is good (see FIG. 5).

Buckling Strength of Bottle

The bottle obtained by blow molding as described above was allowed to stand vertically, and a load was applied vertically from the top to the bottom of the bottle at 23° C. and a test speed of 20 mm/min. Upon compression, the generated maximum load was reported as a buckling strength of the bottle.

Apparent Shear Stress

The apparent shear stress was measured using a Capillary Rheometer manufactured by Toyo Seiki Co., Ltd. with a capillary die having an inner diameter of 0.5 mm, and a length of 3.0 mm, at 190° C., and a shear rate of 194.57 sec$^{-1}$, in accordance with JIS K7199. The barrel diameter of the Capillary Rheometer was 9.55 mm.

Tensile Fatigue Strength at 80° C.

A specimen for the measurement of tensile fatigue strength at 80° C. was prepared by molding a 6 mm-thick sheet (spacer-shaped: 4 specimens of a size of 30×60×6 mm obtained from a sheet of a size of 200×200×6 mm) at a pressure of 100 kg/cm$^2$ using a hydraulic thermal press machine manufactured by Shinto Metal Industries, Ltd. set at 190° C., and by cooling the sheets via compressing under a pressure of 100 kg/cm$^2$ using another hydraulic thermal press machine manufactured by Shinto Metal Industries, Ltd. set at 20° C. From the pressed sheet having a size of 30×60×6 mm, a rectangular column with a size of length 5 to 6 mm×width 6 mm×height 60 mm was cut out for use as a specimen for the evaluation of actual measurement.

The tensile fatigue strength (specimen form) was measured according to JIS K-6774 using a Servo-Pulser of the EHF-ER1KN×4-40L type manufactured by Shimazu Seisakusho Ltd. (Full-notch type, notch depth=1 mm). Summary of the evaluation conditions are as follows: several points were measured under the conditions of specimen form: 5 to 6×6×60 mm, notched rectangular column; waveform and frequency for testing: rectangular wave, 0.5 Hz; temperature for testing: 80° C.; and actual stress in the range of 10 to 18 MPa. The oscillation frequency upon fracture of the specimen was taken as the fatigue strength. Here, at least three points of different actual stress values were measured, for a three or more digit number of cycles to fracture, or under an actual stress in the range of 3 MPa or greater, in order to provide an approximation formula by means of the least square method with logarithmic approximation. Thus, the actual stress values with the numbers of cycles to fracture corresponding to 10,000 cycles and 100,000 cycles were determined.

Tensile Fatigue Strength at 23° C.

Figure 4:
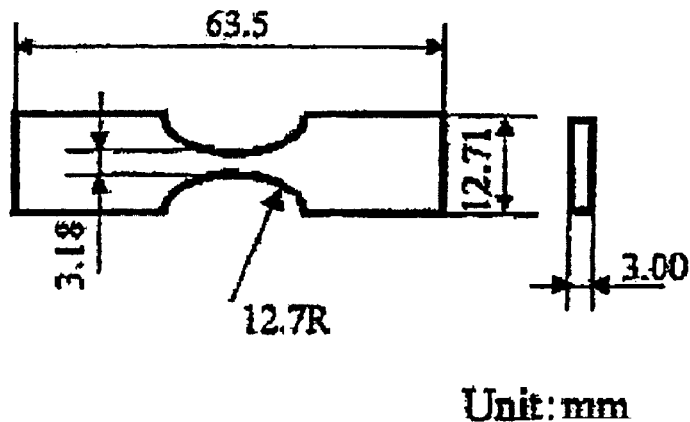
FIG. 4 is a diagram showing a specimen for the tensile fatigue test at 23° C.

A 3 mm-thick dumbbell (ASTM-D-1822 Type S) as shown in FIG. 4 was prepared by molding (spacer-shaped: the form of ASTM-D-1822 Type S was provided from the sheet having a size of 240×240×3 mm) under a pressure of 100 kg/cm$^2$ using a hydraulic thermal press machine manufactured Shinto Metal Industries, Ltd. set at 190° C., and cooling it via compressing under a pressure of 100 kg/cm$^2$ using another hydraulic thermal press machine manufactured by Shinto Metal Industries, Ltd. set at 20° C., a sample for evaluation of the tensile fatigue strength at 23° C. was taken therefrom. An SUS plate with a thickness of 5 mm was used as a heating plate. The tensile fatigue strength at 23° C. was measured according to JIS K-7118 using a Servo-Pulser of the EHF-FG10KN-4 LA type manufactured by Shimazu Seisakusho Ltd. Summary of the evaluation conditions are presented below.

Figure 3:
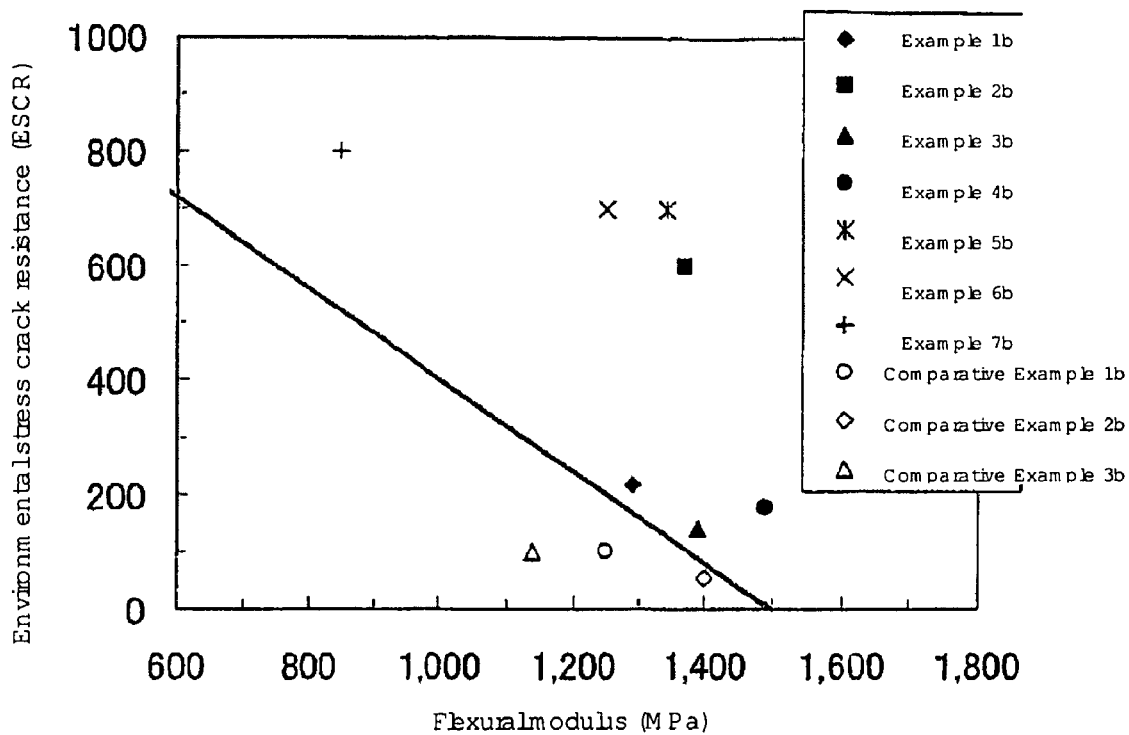
FIG. 3 is a chart obtained by plotting the flexural modulus M (MPa) as measured at 23° C. against the environmental stress cracking resistance ESCR (T, hr) at 50° C. for the representative ethylene polymers as described in Examples and Comparative Examples of the present invention.

Specimen shape: ASTM-D-1822 Type S (Dumbbell as described in FIG. 3, unnotched)

Waveform and frequency for testing: sinusoidal wave 4 Hz

Temperature for testing: 23° C.

The tensile fatigue strength test was carried out by measuring at several points under the above-mentioned conditions (testing temperature, waveform and frequency for testing), with a constant minimum load of the load cell of 4.9 N (0.5 kgf) and an actual stress with the maximum corrected at the central cross-section of the specimen prior to testing, in the range of 14 to 27 MPa. A 50% elongation of the specimen was defined as fracture, and the oscillation frequency at this time was taken as the fatigue strength for the actual stress loaded. The actual stress corresponding to 10,000 cycles and 100,000 cycles to fracture was determined by performing measurement for at least one digit number of cycles to fracture or to obtain an actual stress in the range of 1 MPa or greater, and providing an approximation formula by means of the least square method with logarithmic approximation.

Synthesis Example 1

[Preparation of Solid Catalyst Component (α)]

A suspension was prepared from 8.5 kg of silica dried at 200° C. for 3 hours and 33 liters of toluene, and then 82.7 liters of a methylaluminoxane solution (Al=1.42 mol/liter) was added dropwise over 30 minutes. Then, the temperature of the mixture was elevated to 115° C. over 1.5 hours, and the mixture was allowed to react at that temperature for 4 hours. Subsequently, the reaction mixture was cooled to 60° C., and the supernatant liquid was removed by decantation. Thus obtained solid catalyst component washed with toluene three times and resuspended in toluene to yield a solid catalyst component (a) (total volume 150 liters).

Synthesis Example 2

[Preparation of Supported Catalyst]

In a reactor which had been sufficiently purged with nitrogen, 19.60 mmol (in terms of aluminum) of the solid catalyst component (α) suspended in toluene synthesized in Synthesis Example 1 was added, and under stirring, 2 liters (61.12 mmol) of a 31.06 mmol/liter solution of di(p-tolyl)methylene (cyclopentadienyl) (octamethyloctahydrodibenzofluorenyl) zirconium dichloride was added to the suspension at room temperature (20 to 25° C.), and the resulting mixture being stirred for 60 minutes. After stirring being stopped, the supernatant liquid was removed by decantation, and the mixture washed with 40 liters of n-hexane for two times. Thus obtained supported catalyst was reslurried in n-hexane to yield a solid catalyst component (γ) as 25 liters of a catalyst suspension.

[Preparation of Solid Catalyst Component (δ) by Prepolymerization of Solid Catalyst Component (γ)]

To a reactor equipped with a stirrer, 15.8 liters of purified n-hexane and the above-mentioned solid catalyst component (γ) were introduced under a nitrogen atmosphere, then 5 mol of triisobutylaluminum was added under stirring, and prepolymerization was carried out with ethylene in an amount such that 3 g of polyethylene is produced per gram of the solid component in 4 hours. The polymerization temperature was maintained at 20 to 25° C. After completion of polymerization, stirring was stopped, the supernatant liquid was removed by decantation, and the solids were washed with 35 liters of n-hexane for 4 times. Thus obtained supported catalyst was suspended in 20 liters of n-hexane to give a solid catalyst component (δ) as a catalyst suspension.

Example $1_b$

[Polymerization]

To a first polymerization reactor, 45 liters/hr of hexane, 0.07 mmol/hr (in terms of Zr atoms) of the solid catalyst component (6) obtained in Synthesis Example 2, 20 mmol/hr of triethylaluminum, 7.0 kg/hr of ethylene, and 40 N-liters/hr of hydrogen were continuously supplied. Further, a polyethylene glycol/polypropylene glycol block copolymer having a viscosity of 500 mPa·s, as measured by a B type viscometer at 25° C. (Product name: EPAN720, manufactured by Dai-Ichi Kogyo Seiyaku co., Ltd.) was continuously supplied at 0.5 g/hr. Meanwhile, polymerization was carried out under the conditions such as a polymerization temperature of 80° C., a reaction pressure of 7.6 kg/cm$^2$G and an average residence time of 2.6 hr, while continuously withdrawing the contents in the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 3.0 kg/hr of ethylene, 5.5 N-liter/hr of hydrogen and 110 g/hr of 1-hexene, and polymerization was continued under the conditions such as a polymerization temperature of 75° C., a reaction pressure of 3.3 kg/cm$^2$G and an average residence time of 1.4 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, 0.20 part by weight of tri(2,4-di-t-butylphenyl)phosphate as a secondary anti-oxidizing agent, 0.20 part by weight of n-octadecyl-3-(4'-hydroxy-3',5'-di-t-butylphenyl)propionate as a heat-resistant stabilizer, and 0.15 part by weight of calcium stearate as a hydrochloric acid absorbent were blended. Thereafter, a sample for measurement was prepared by pelletization at a set temperature of 200° C. and a resin extrusion amount of 25 kg/hr using a single screw extruder (screw diameter 65 mm, L/D=28, screen mesh 40/60/300×4/60/40) manufactured by Placo Co., Ltd. Further, a pressed sheet was prepared using this sample to measure the properties. The results are presented in Tables $1_b$ to $3_b$. As compared with Comparative Examples, this sample is excellent in the balance between stiffness and the ESCR property. Further, a bottle was prepared using this sample to measure the properties of the bottle. The results are presented in Tables $4_b$. As compared with Comparative Examples, the bottle molded product is excellent in the balance between stiffness and the ESCR property.

Example $2_b$

[Polymerization]

To a first polymerization reactor, 45 liters/hr of hexane, 0.2 mmol/hr (in terms of Zr atoms) of the solid catalyst component (δ) obtained in Synthesis Example 2, 20 mmol/hr of triethylaluminum, 11.0 kg/hr of ethylene, and 75 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 85° C., a reaction pressure of 7.5 kg/cm$^2$G and an average residence time of 2.4 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 5.5 kg/hr of ethylene, 4.0 N-liter/hr of hydrogen and 98 g/hr of 1-hexene, and polymerization was continued under the conditions such as a polymerization temperature of 75° C., a reaction pressure of 2.9 kg/cm$^2$G and an average residence time of 1.3 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example $1_b$ were mixed in the same parts by weight. Thereafter, a sample for measurement was prepared by pelletization at the same set temperature and the same resin extrusion amount as in Example 1 using a single screw extruder manufactured by Placo Co., Ltd. Further, a pressed sheet was prepared using this sample to measure the properties. The results are presented in Tables $1_b$ to $3_b$. As compared with Comparative Examples, this sample is excellent in the balance between stiffness and the ESCR property. Further, a bottle was prepared using this sample to measure the properties of the bottle. The results are presented in Tables $4_b$. As compared with Comparative Examples, the bottle molded product is excellent in the balance between stiffness and the ESCR property.

Example $3_b$

[Polymerization]

To a first polymerization reactor, 45 liters/hr of hexane, 0.2 mmol/hr (in terms of Zr atoms) of the solid catalyst component (δ) obtained in Synthesis Example 2, 20 mmol/hr of triethylaluminum, 11.0 kg/hr of ethylene, and 80 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 85° C., a reaction pressure of 7.6 kg/cm$^2$G and an average residence time of 2.4 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 5.5 kg/hr of ethylene, 3.4 N-liter/hr of hydrogen and 66 g/hr of 1-hexene, and polymerization was continued under the conditions such as a polymerization temperature of 75° C., a reaction pressure of 3.0 kg/cm$^2$G and an average residence time of 1.3 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1$_b$ were mixed in the same parts by weight. Thereafter, a sample for measurement was prepared by pelletization at the same set temperature and the same resin extrusion amount as in Example 1$_b$ using a single screw extruder manufactured by Placo Co., Ltd. Further, a pressed sheet was prepared using this sample to measure the properties. The results are presented in Tables 1$_b$ to 3$_b$. As compared with Comparative Examples, this sample is excellent in the balance between stiffness and the ESCR property. Further, a bottle was prepared using this sample to measure the properties of the bottle. The results are presented in Tables 4$_b$. As compared with Comparative Examples, the bottle molded product is excellent in the balance between stiffness and the ESCR property.

Example 4$_b$

[Polymerization]

To a first polymerization reactor, 45 liters/hr of hexane, 0.1 mmol/hr (in terms of Zr atoms) of the solid catalyst component (δ) obtained in Synthesis Example 2, 20 mmol/hr of triethylaluminum, 7.0 kg/hr of ethylene, and 75 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 85° C., a reaction pressure of 7.5 kg/cm$^2$G and an average residence time of 2.6 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 3.5 kg/hr of ethylene, 3.0 N-liter/hr of hydrogen and 52 g/hr of 1-hexene, and polymerization was continued under the conditions such as a polymerization temperature of 75° C., a reaction pressure of 3.2 kg/cm$^2$G and an average residence time of 1.3 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1$_b$ were mixed in the same parts by weight. Thereafter, a sample for measurement was prepared by pelletization at the same set temperature and the same resin extrusion amount as in Example 1$_b$ using a single screw extruder manufactured by Placo Co., Ltd. Further, a pressed sheet was prepared using this sample to measure the properties. The results are presented in Tables 1$_b$ to 3$_b$. As compared with Comparative Examples, this sample is excellent in the balance between stiffness and the ESCR property. Further, a bottle was prepared using this sample to measure the properties of the bottle. The results are presented in Tables 4$_b$. As compared with Comparative Examples, the bottle molded product is excellent in the balance between stiffness and the ESCR property.

Example 5$_b$

[Polymerization]

To a first polymerization reactor, 45 liters/hr of hexane, 0.13 mmol/hr (in terms of Zr atoms) of the solid catalyst component (δ) obtained in Synthesis Example 2, 20 mmol/hr of triethylaluminum, 11.0 kg/hr of ethylene, and 50 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 75° C., a reaction pressure of 7.5 kg/cm$^2$G and an average residence time of 2.6 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 4.7 kg/hr of ethylene, 3.0 N-liter/hr of hydrogen and 97 g/hr of 1-hexene, and polymerization was continued under the conditions such as a polymerization temperature of 75° C., a reaction pressure of 3.2 kg/cm²G and an average residence time of 1.3 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example $1_b$ were mixed in the same parts by weight. Thereafter, a sample for measurement was prepared by pelletization at the same set temperature and the same resin extrusion amount as in Example $1_b$ using a single screw extruder manufactured by Placo Co., Ltd. Further, a pressed sheet was prepared using this sample to measure the properties. The results are presented in Tables $1_b$ to $3_b$. As compared with Comparative Examples, this sample is excellent in the balance between stiffness and the ESCR property. Further, a bottle was prepared using this sample to measure the properties of the bottle. The results are presented in Tables $4_b$. As compared with Comparative Examples, the bottle molded product is excellent in the balance between stiffness and the ESCR property.

Example $6_b$

[Polymerization]

To a first polymerization reactor, 45 liters/hr of hexane, 0.1 mmol/hr (in terms of Zr atoms) of the solid catalyst component (δ) obtained in Synthesis Example 2, 20 mmol/hr of triethylaluminum, 9.1 kg/hr of ethylene, and 50 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 75° C., a reaction pressure of 7.5 kg/cm²G and an average residence time of 2.6 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm²G and at 60° C.

Then, the contents were continuously supplied to a second polymerization reactor, together with 43 liters/hr of hexane, 3.9 kg/hr of ethylene, 1.0 N-liter/hr of hydrogen and 100 g/hr of 1-hexene, and polymerization was continued under the conditions such as a polymerization temperature of 75° C., a reaction pressure of 3.2 kg/cm²G and an average residence time of 1.3 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example $1_b$ were mixed in the same parts by weight. Thereafter, a sample for measurement was prepared by pelletization at the same set temperature and the same resin extrusion amount as in Example $1_b$ using a single screw extruder manufactured by Placo Co., Ltd. Further, a pressed sheet was prepared using this sample to measure the properties. The results are presented in Tables $1_b$ to $3_b$. As compared with Comparative Examples, this sample is excellent in the balance between stiffness and the ESCR property. Further, a bottle was prepared using this sample to measure the properties of the bottle. The results are presented in Tables $4_b$. As compared with Comparative Examples, the bottle molded product is excellent in the balance between stiffness and the ESCR property.

Example $7_b$

[Polymerization]

To a first polymerization reactor, 45 liters/hr of hexane, 0.1 mmol/hr (in terms of Zr atoms) of the solid catalyst component (δ) obtained in Synthesis Example 2, 20 mmol/hr of triethylaluminum, 7.0 kg/hr of ethylene, and 75 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 85° C., a reaction pressure of 7.5 kg/cm²G and an average residence time of 2.6 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm²G and at 60° C.

Then, the contents were continuously supplied to a second polymerization reactor, together with 43 liters/hr of hexane, 3.5 kg/hr of ethylene, 3.0 N-liter/hr of hydrogen and 150 g/hr of 1-hexene, and polymerization was continued under the conditions such as a polymerization temperature of 75° C., a reaction pressure of 3.2 kg/cm²G and an average residence time of 1.3 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example $1_b$ were mixed in the same parts by weight. Thereafter, a sample for measurement was prepared by pelletization at the same set temperature and the same resin extrusion amount as in Example $1_b$ using a single screw extruder manufactured by Placo Co., Ltd. Further, a pressed sheet was prepared using this sample to measure the properties. The results are presented in Tables $1_b$ to $3_b$. As compared with Comparative Examples, this sample is excellent in the balance between stiffness and the ESCR property. Further, a bottle was prepared using this sample to measure the properties of the bottle. The results are presented in Tables $4_b$. As compared with Comparative Examples, the bottle molded product is excellent in the balance between stiffness and the ESCR property.

Comparative Example $1_b$

The pellets of product HI-ZEX 6008 B manufactured by Mitsui Chemicals, Inc. were used as the sample for measurement. The co-monomer was 1-butene. A pressed sheet was prepared using this sample to measure the properties. The results are presented in Tables $1_b$ to $3_b$. As compared with Examples, this sample is inferior in the balance between stiffness and the ESCR property. Further, a bottle was prepared using this sample to measure the properties of the bottle. The results are presented in Tables $4_b$. As compared with Examples, the bottle molded product is inferior in properties.

Comparative Example $2_b$

The pellets of product HI-ZEX 6700 B manufactured by Mitsui Chemicals, Inc. were used to prepare a pressed sheet, and their properties were measured. The results are presented in Tables $1_b$ to $3_b$. As compared with Examples, this sample is inferior in stiffness and the ESCR property is not so good. Further, a bottle was prepared using this sample to measure the properties of the bottle. The results are presented in Tables $4_b$. As compared with Examples, the bottle molded product is inferior in properties.

Comparative Example $3_b$

The pellets of product Novatec HD HB332R manufactured by Japan Polyethylene Corp. were used to prepare a pressed sheet, and its properties were measured. The results are presented in Tables $1_b$ $_{to}$ $3_b$. As compared with Examples, this sample is inferior both in stiffness and the ESCR property. Further, a bottle was prepared using this sample to measure the properties of the bottle. The results are presented in Tables $4_b$. As compared with Examples, the bottle molded product is inferior in properties.

Example $1_e$

[Polymerization]
To a first polymerization reactor, 45 liters/hr of hexane, 0.08 mmol/hr (in terms of Zr atoms) of the solid catalyst component (δ) obtained in Synthesis Example 2, 20 mmol/hr of triethylaluminum, 7.0 kg/hr of ethylene, and 45 N-liters/hr of hydrogen were continuously supplied. Further, a polyethylene glycol/polypropylene glycol block copolymer having a viscosity of 500 mPa·s, as measured by a B type viscometer at 25° C. (Product name: EPAN720, manufactured by Dai-Ichi Kogyo Seiyaku co., Ltd.) was continuously supplied at 0.5 g/hr. Meanwhile, polymerization was carried out under the conditions such as a polymerization temperature of 85° C., a reaction pressure of 7.5 kg/cm²G and an average residence time of 2.6 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm²G and at 60° C.

Then, the s were continuously supplied to a second polymerization reactor, together with 43 liters/hr of hexane, 5.5 kg/hr of ethylene, 5.0 N-liter/hr of hydrogen and 270 g/hr of 1-hexene, and polymerization was continued under the conditions such as a polymerization temperature of 75° C., a reaction pressure of 2.3 kg/cm²G and an average residence time of 1.4 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, 0.1 part by weight of tri(2,4-di-t-butylphenyl)phosphate as a secondary anti-oxidizing agent, 0.10 part by weight of n-octadecyl-3-(4'-hydroxy-3',5'-di-t-butylphenyl)propionate as a heat-resistant stabilizer, and 0.10 part by weight of calcium stearate as a hydrochloric acid absorbent were blended. Thereafter, a sample for measurement was prepared by pelletization at a set temperature of 200° C. and a resin extrusion amount of 25 kg/hr and using a single screw extruder (screw diameter 65 mm, L/D=28, screen mesh 40/60/300×4/60/40) manufactured by Placo Co., Ltd. Further, a pressed sheet was prepared using this sample to measure the properties. The results are presented in Tables $1_e$ to $5_e$. As compared with Comparative Examples $2_e$ and $3_e$, this sample has extremely higher tensile fatigue strength at 80° C. than that of the samples used in Comparative Examples $2_e$ and $3_e$. Further, as it can be seen from the results that the apparent shear stress is almost the same as that of the samples used in Comparative Examples $2_e$ and $3_e$, this sample has comparative moldability. Further, this sample has tensile fatigue strength at 80° C. of no less than that of the sample used in Comparative Example $1_e$, and apparent shear stress is extremely lower than the sample used in Comparative Example $1_e$ showing good moldability. That is, it can be seen that as compared with Comparative Examples, this sample is excellent in the balance between tensile fatigue strength and moldability.

Example $2_e$

[Polymerization]
To a first polymerization reactor, 45 liters/hr of hexane, 0.07 mmol/hr (in terms of Zr atoms) of the solid catalyst component (δ) obtained in Synthesis Example 2, 20 mmol/hr of triethylaluminum, 7.0 kg/hr of ethylene, and 40 N-liters/hr of hydrogen were continuously supplied. Further, a polyethylene glycol/polypropylene glycol block copolymer having a viscosity of 500 mPa·s, as measured by a B type viscometer at 25° C. (Product name: EPAN720, manufactured by Dai-Ichi Kogyo Seiyaku co., Ltd.) was continuously supplied at 0.5 g/hr. Meanwhile, polymerization was carried out under the conditions such as a polymerization temperature of 80° C., a reaction pressure of 7.4 kg/cm$^2$G and an average residence time of 2.6 hr, while continuously withdrawing the contents of the reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 3.8 kg/hr of ethylene, 4.5 N-liter/hr of hydrogen and 180 g/hr of 1-hexene, and polymerization was continued under the conditions such as a polymerization temperature of 75° C., a reaction pressure of 3.5 kg/cm$^2$G and an average residence time of 1.4 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1$_e$ were mixed in the same parts by weight. Thereafter, a sample for measurement was prepared by pelletization at the same set temperature and the same resin extrusion amount as in Example 1$_e$ using a single screw extruder manufactured by Placo Co., Ltd. Further, a pressed sheet was prepared using this sample to measure the properties. The results are presented in Tables 1$_e$ to 5$_e$. As in Example 1$_e$, it can be seen that as compared with Comparative Examples, this sample is extremely excellent in the balance between tensile fatigue strength and moldability.

Example 3$_e$

[Polymerization]

To a first polymerization reactor, 45 liters/hr of hexane, 0.07 mmol/hr (in terms of Zr atoms) of the solid catalyst component (δ) obtained in Synthesis Example 2, 20 mmol/hr of triethylaluminum, 7.0 kg/hr of ethylene, and 40 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 80° C., a reaction pressure of 7.4 kg/cm$^2$G and an average residence time of 2.6 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 3.8 kg/hr of ethylene, 4.5 N-liter/hr of hydrogen and 220 g/hr of 1-hexene, and polymerization was continued under the conditions such as a polymerization temperature of 75° C., a reaction pressure of 3.5 kg/cm$^2$G and an average residence time of 1.4 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example 1$_e$ were mixed in the same parts by weight. Thereafter, a sample for measurement was prepared by pelletization at the same set temperature and the same resin extrusion amount as in Example 1$_e$ using a single screw extruder manufactured by Placo Co., Ltd. Further, a pressed sheet was prepared using this sample to measure the properties. The results are presented in Tables 1$_e$ to 5$_e$. As in Example 1$_e$, it can be seen that as compared with Comparative Examples, this sample is extremely excellent in the balance between tensile fatigue strength and moldability.

Example 4$_e$

[Polymerization]

To a first polymerization reactor, 45 liters/hr of hexane, 0.19 mmol/hr (in terms of Zr atoms) of the solid catalyst component (δ) obtained in Synthesis Example 2, 20 mmol/hr of triethylaluminum, 11.0 kg/hr of ethylene, and 50 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 75° C., a reaction pressure of 7.6 kg/cm$^2$G and an average residence time of 2.4 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm$^2$G and at 60° C.

Then, the contents were continuously supplied to a second polymerization reactor, together with 43 liters/hr of hexane, 7.3 kg/hr of ethylene, 5.0 N-liter/hr of hydrogen and 270 g/hr of 1-hexene, and polymerization was continued under the conditions such as a polymerization temperature of 75° C., a reaction pressure of 3.2 kg/cm$^2$G and an average residence time of 1.2 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contents withdrawn from the second polymerization reactor at a rate of 2 liters/hr to deactivate the catalyst for polymerization.

Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example $1_e$ were mixed in the same parts by weight. Thereafter, a sample for measurement was prepared by pelletization at the same set temperature and the same resin extrusion amount as in Example $1_e$ using a single screw extruder manufactured by Placo Co., Ltd. Further, a pressed sheet was prepared using this sample to measure the properties. The results are presented in Tables $1_e$ to $5_e$. As in Example $1_e$, it can be seen that as compared with Comparative Examples, this sample is extremely excellent in the balance between tensile fatigue strength and moldability.

Example $5_e$

[Polymerization]

To a first polymerization reactor, 45 liters/hr of hexane, 0.13 mmol/hr (in terms of Zr atoms) of the solid catalyst component (δ) obtained in Synthesis Example 2, 20 mmol/hr of triethylaluminum, 8.1 kg/hr of ethylene, and 60 N-liters/hr of hydrogen were continuously supplied. Further, a polyethylene glycol/polypropylene glycol block copolymer having a viscosity of 370 mPa·s, as measured by a B type viscometer at 25° C. (Product name: Adeka Pluronic L-71, manufactured by Adeka Corporation) was continuously supplied at 0.8 g/hr. Meanwhile, polymerization was carried out under the conditions such as a polymerization temperature of 75° C., a reaction pressure of 7.5 kg/cm²G and an average residence time of 2.4 hr, while continuously withdrawing the contents of the polymerization reactor so that the liquid level in the polymerization reactor would be maintained constant. The contents continuously withdrawn from the first polymerization reactor were subjected to substantial removal of unreacted ethylene and hydrogen in a flash drum maintained at an internal pressure of 0.30 kg/cm²G and at 60° C.

Then, the contens were continuously supplied to a second polymerization reactor, together with 43 liters/hr of hexane, 6.6 kg/hr of ethylene, 5.0 N-liter/hr of hydrogen and 163 g/hr of 1-hexene, and polymerization was continued under the conditions such as a polymerization temperature of 75° C., a reaction pressure of 3.2 kg/cm²G and an average residence time of 1.2 hr.

Also for the second polymerization reactor, the contents of the polymerization reactor were continuously withdrawn so that the liquid level in the polymerization reactor would be maintained constant. In order to prevent undesirable polymerization such as generation of a polymer containing a large proportion of 1-hexene, methanol was supplied to the contens withdrawn from the second polymerization reactor at a rate of 2 liters/hr to deactivate the catalyst for polymerization. Then, the contents were subjected to removal of hexane and unreacted monomer in a solvent separation unit and dried to give the polymer.

Next, with respect to 100 parts by weight of the polymer particle, the same secondary anti-oxidizing agent, heat-resistant stabilizer and hydrochloric acid absorbent as used in Example $1_e$ were mixed in the same parts by weight. Thereafter, a sample for measurement was prepared by pelletization at the same set temperature and the same resin extrusion amount as in Example $1_e$ using a single screw extruder manufactured by Placo Co., Ltd. Further, a pressed sheet was prepared using this sample to measure the properties. The results are presented in Tables $1_e$ to $5_e$. As in Example $1_e$, it can be seen that as compared with Comparative Examples, this sample is extremely excellent in the balance between tensile fatigue strength and moldability.

Comparative Example $1_e$

The pellets of product HI-ZEX 7700M manufactured by Mitsui Chemicals, Inc. were used as the sample for measurement. The co-monomer was 1-butene. A pressed sheet was prepared using this sample to measure the properties. The results are presented in Tables $1_e$ to $5_e$. It can be seen that as compared with Examples, this sample has the same level of tensile fatigue strength at 80° C., but has higher apparent shear stress showing extremely inferior moldability.

Comparative Example $2_e$

The pellets of product HI-ZEX 6300 M manufactured by Mitsui Chemicals, Inc. were used as the sample for measurement. The co-monomer was 1-butene. A pressed sheet was prepared using this sample to measure the properties. The results are presented in Tables $1_e$ to $5_e$. It can be seen that as compared with Examples, this sample has the same level of apparent shear stress but has extremely inferior tensile fatigue strength at 80° C.

Comparative Example $3_e$

The pellets of product NEO-ZEX 4005 M manufactured by Mitsui Chemicals, Inc. were used as the sample for measurement. The co-monomer was 1-butene. A pressed sheet was prepared using this sample to measure the properties. The results are presented in Tables $1_e$ to $5_e$. It can be seen that as compared with Examples, this sample has the same level of apparent shear stress but has extremely inferior tensile fatigue strength at 80° C.

TABLE $1_b$

|  | [η] dl/g | Density Kg/m³ | Co-monomer | Amount of co-monomers (mol/%) |
|---|---|---|---|---|
| Example 1b | 2.11 | 961 | 1-Hexene | 0.11 |
| Example 2b | 2.15 | 962 | 1-Hexene | 0.12 |
| Example 3b | 2.14 | 964 | 1-Hexene | 0.07 |
| Example 4b | 2.18 | 965 | 1-Hexene | 0.07 |
| Example 5b | 2.18 | 961 | 1-Hexene | 0.12 |
| Example 6b | 2.16 | 960 | 1-Hexene | 0.16 |
| Example 7b | 2.16 | 955 | 1-Hexene | 0.25 |
| Comparative Example 1b | 2.40 | 958 | 1-butene | 0.67 |
| Comparative Example 2b | 2.42 | 962 | 1-butene | — |
| Comparative Example 3b | 2.54 | 955 | 1-Hexene | — |

TABLE $2_b$

| | CFC | |
|---|---|---|
| | Temperature on which all the components with a molecular weight of 100,000 or more are eluted | Proportion of the components eluted at 80° C. or lower in the all the components |
| Example 1b | — | — |
| Example 2b | 94 | 1.9 |
| Example 3b | — | — |
| Example 4b | — | — |
| Example 5b | 93 | 3.2 |

TABLE 2$_b$-continued

| | CFC | |
|---|---|---|
| | Temperature on which all the components with a molecular weight of 100,000 or more are eluted | Proportion of the components eluted at 80° C. or lower in the all the components |
| Example 6b | 93 | 1.5 |
| Example 7b | 91 | 2.8 |
| Comparative Example 1b | 83 | 7.1 |
| Comparative Example 2b | — | — |
| Comparative Example 3b | None | 3.1 |

TABLE 3$_b$

| | Flexural modulus MPa | ESCR F50 | Tanδ | Thickness ratio of the pinched part (a/b) |
|---|---|---|---|---|
| Example 1b | 1,290 | 217 | 0.86 | 1.17 |
| Example 2b | 1,370 | 600 | 0.66 | 0.82 |
| Example 3b | 1,390 | 140 | 0.64 | 0.82 |
| Example 4b | 1,490 | 177 | 0.60 | 0.91 |
| Example 5b | 1,340 | 700 | 0.78 | 1.10 |
| Example 6b | 1,250 | 700 | 0.75 | 1.05 |
| Example 7b | 850 | 800 | 0.79 | 1.15 |
| Comparative Example 1b | 1,250 | 100 | 0.71 | 0.97 |
| Comparative Example 2b | 1,400 | 54 | 0.70 | 0.91 |
| Comparative Example 3b | 1,140 | 100 | 0.70 | 0.95 |

TABLE 4$_b$

| | Buckling Strength N | ESCR F50 hr |
|---|---|---|
| Example 1b | 520 | 455 |
| Example 2b | 550 | 300 |
| Example 3b | 560 | 150 |
| Example 4b | 600 | 180 |
| Example 5b | 520 | 520 |
| Example 6b | 510 | >600 |
| Example 7b | 450 | >600 |
| Comparative Example 1b | 500 | 100 |
| Comparative Example 2b | 550 | 60 |
| Comparative Example 3b | 450 | 55 |

TABLE 1$_e$

| | [η] dl/g | Density kg/m$^3$ | Co-monomer — | Amount of co-monomers mol % |
|---|---|---|---|---|
| Example 1e | 2.56 | 954 | 1-hexene | 0.48 |
| Example 2e | 2.43 | 954 | 1-hexene | 0.24 |
| Example 3e | 2.49 | 953 | 1-hexene | 0.32 |
| Example 4e | 2.51 | 952 | 1-hexene | 0.28 |
| Example 5e | 2.38 | 954 | 1-hexene | 0.24 |
| Comparative Example 1e | 3.34 | 952 | 1-butene | 0.80 |
| Comparative Example 2e | 2.79 | 951 | 1-butene | 1.00 |

TABLE 1$_e$-continued

| | [η] dl/g | Density kg/m$^3$ | Co-monomer — | Amount of co-monomers mol % |
|---|---|---|---|---|
| Example 2e Comparative Example 3e | 2.64 | 941 | 1-butene | 2.00 |

TABLE 2$_e$

| | CFC | |
|---|---|---|
| | Temperature on which all the components with a molecular weight of 100,000 or more are eluted | Proportion of the components eluted at 80° C. or lower in the all the components |
| Example 1e | — | — |
| Example 2e | 89 | 1.4 |
| Example 3e | — | — |
| Example 4e | 88 | 2.0 |
| Example 5e | 90 | 2.0 |
| Comparative Example 1e | 81 | 7.9 |
| Comparative Example 2e | 81 | 10.7 |
| Comparative Example 3e | 82 | 3.9 |

TABLE 3$_e$

| | MFR$_5$ kg g/10 min | MFR$_{21.6 kg}$ g/10 min | MFR$_{21.6}$/MFR$_5$ | Apparent shear stress (MPa) |
|---|---|---|---|---|
| Example 1e | 0.79 | 23.2 | 29.4 | 5.8 |
| Example 2e | 0.79 | 15.3 | 19.4 | 6.4 |
| Example 3e | 0.67 | 14.3 | 21.3 | 6.1 |
| Example 4e | 0.71 | 14.4 | 20.3 | 6.3 |
| Example 5e | 0.96 | 14.4 | 15.0 | 5.5 |
| Comparative Example 1e | 0.27 | 10.1 | 37.4 | 7.7 |
| Comparative Example 2e | 0.59 | 19.5 | 33.1 | 5.5 |
| Comparative Example 3e | 0.90 | 18.4 | 20.4 | 6.3 |

TABLE 4$_e$

| | | Tensile fatigue at 80° C. | | |
|---|---|---|---|---|
| Example 1e | Cycles of Fracture | 9528 | 15328 | 33067 |
| | Stress (MPa) | 13.2 | 12.4 | 11.8 |
| Example 2e | Cycles of Fracture | 25508 | 61713 | 86005 |
| | Stress (MPa) | 13.2 | 11.9 | 11.0 |
| Example 3e | Cycles of Fracture | 25697 | 49844 | 99125 |
| | Stress (MPa) | 13.1 | 12.4 | 11.6 |
| Example 4e | Cycles of Fracture | 16531 | 33481 | 134908 |
| | Stress (MPa) | 13.2 | 12.5 | 11.1 |
| Example 5e | Cycles of Fracture | 10608 | 15537 | 41856 |
| | Stress (MPa) | 13.2 | 12.5 | 11.5 |
| Comparative Example 1e | Cycles of Fracture | 108 | 2690 | 14690 |
| | Stress (MPa) | 14.6 | 12.3 | 10.5 |
| Comparative Example 2e | Cycles of Fracture | 3467 | 11212 | 128563 |
| | Stress (MPa) | 10.6 | 7.9 | 5.1 |

TABLE 4e-continued

| | | Tensile fatigue at 80° C. | | |
|---|---|---|---|---|
| Comparative Example 3e | Cycles of Fracture | 288 | 5911 | 63505 |
| | Stress (MPa) | 10.9 | 8.0 | 5.1 |

TABLE 5e

| | | 23° C. tensile fatigue | | | |
|---|---|---|---|---|---|
| Example 1e | Cycles of Fracture | 3,006 | 10,609 | 63,378 | 170,313 |
| | Actual stress (MPa) | 21.0 | 19.8 | 18.5 | 17.9 |
| Example 2e | Cycles of Fracture | 2,256 | 10,590 | 29,440 | 136,965 |
| | Actual stress (MPa) | 21.0 | 19.8 | 19.3 | 18.7 |
| Example 3e | Cycles of Fracture | 10,603 | 20,419 | 43,888 | 255,553 |
| | Actual stress (MPa) | 19.8 | 19.3 | 18.6 | 18.1 |
| Example 4e | Cycles of Fracture | 2,494 | 16,400 | 26,581 | 249,198 |
| | Actual stress (MPa) | 19.8 | 19.2 | 18.6 | 18.0 |
| Example 5e | Cycles of Fracture | — | — | — | — |
| | Actual stress (MPa) | — | — | — | — |
| Comparative Example 1e | Cycles of Fracture | 5,754 | 12,318 | 38,630 | 115,000 |
| | Actual stress (MPa) | 19.4 | 19.3 | 18.7 | 17.8 |
| Comparative Example 2e | Cycles of Fracture | 1,701 | 4,447 | 8,569 | 94,827 |
| | Actual stress (MPa) | 19.8 | 19.3 | 18.7 | 17.5 |
| Comparative Example 3e | Cycles of Fracture | 1,739 | 6,323 | 16,066 | 121,151 |
| | Actual stress (MPa) | 16.3 | 15.7 | 15.4 | 15.1 |

INDUSTRIAL AVAILABILITY

The ethylene polymer of the present invention is excellent in moldability, and the molded product made therefrom exhibits excellent mechanical strength and is useful in various industrial applications.

The invention claimed is:

1. An ethylene polymer containing 0.02 to 0.50 mol % of a constitutional unit derived from α-olefin having 6 to 10 carbon atoms, the polymer having a density of 945 to 975 kg/m$^3$ and satisfying the following requirements [1]-[3] and [2b]-[4b] simultaneously:

[1] in cross fractionation chromatography, all the components having a molecular weight of 100,000 or more are eluted at a temperature of 85° C. or higher;

[2] the components eluted at a temperature of 80° C. or lower account for up to 5% of all the components eluted in cross fractionation chromatography;

[3] the environmental stress cracking resistance (ESCR), as measured at 50° C. according to ASTM-D-1693 is in the range of 600 hr to 800 hr;

[2b] the intrinsic viscosity ([η]) as measured in decalin at 135° C. is in the range of 1.6 to 2.8 dL/g;

[3b] the flexural modulus, M (MPa), as measured at 23° C. according to ASTM-D-790 satisfies 600 ≦M<1500, and the environmental stress cracking resistance (ESCR), T (hr), as measured at 50° C. according to ASTM-D-1693 and M, satisfy the following equation (Eq-1):

$$T \geq -0.8 \times M + 1210 \quad \text{(Eq-1); and}$$

[4b] tan δ (loss modulus G"/storage modulus G') as measured at 190° C. and at an angular frequency of 100 rad/sec using a dynamic viscoelasticity measuring apparatus, is in the range of 0.6 to 0.9.

2. A blow molded product, an extrusion molded product, a compression molded product, a vacuum molded product or an injection molded product, made from the ethylene polymer according to claim 1.

3. The blow molded product according to claim 2, which is a gasoline tank, an industrial chemical canister, or a bottle container.

4. The extrusion molded product according to claim 2, which is a pipe, an electric wire covering, or a steel tube/steel wire covering.

5. The injection molded product according to claim 2, which is a pipe joint or an automotive part.

* * * * *